(12) United States Patent
Lim et al.

(10) Patent No.: US 11,941,513 B2
(45) Date of Patent: Mar. 26, 2024

(54) DEVICE FOR ENSEMBLING DATA RECEIVED FROM PREDICTION DEVICES AND OPERATING METHOD THEREOF

(71) Applicant: ELECTRONICS AND TELECOMMUNICATIONS RESEARCH INSTITUTE, Daejeon (KR)

(72) Inventors: Myung-Eun Lim, Daejeon (KR); Jae Hun Choi, Daejeon (KR); Youngwoong Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1154 days.

(21) Appl. No.: 16/699,060

(22) Filed: Nov. 28, 2019

(65) Prior Publication Data

US 2020/0184284 A1    Jun. 11, 2020

(30) Foreign Application Priority Data

Dec. 6, 2018 (KR) .................. 10-2018-0156420
Oct. 8, 2019 (KR) .................. 10-2019-0124616

(51) Int. Cl.
*G06N 3/08* (2023.01)
*G06F 18/24* (2023.01)
(Continued)

(52) U.S. Cl.
CPC ............. *G06N 3/063* (2013.01); *G06F 18/24* (2023.01); *G06F 18/251* (2023.01); *G06N 3/045* (2023.01);
(Continued)

(58) Field of Classification Search
CPC ........ G06N 3/063; G06N 20/20; G06N 3/045; G06N 3/08; G06V 10/82; G06F 18/24; G06F 18/251
See application file for complete search history.

(56) References Cited

U.S. PATENT DOCUMENTS 11,132,602 B1 *   9/2021   Xie ..................... G06F 9/44552
11,170,309 B1 *  11/2021   Stefani ................. G06N 20/00
(Continued)

FOREIGN PATENT DOCUMENTS

KR    20090053578 A    5/2009
KR    20160143512 A    12/2016
(Continued)

*Primary Examiner* — Li B. Zhen
*Assistant Examiner* — Moriam Mosunmola Godo

(57) ABSTRACT

Provided is a device for ensembling data received from prediction devices and a method of operating the same. The device includes a data manager, a learner, and a predictor. The data manager receives first and second device prediction results from first and second prediction devices, respectively. The learner may adjust a weight group of a prediction model for generating first and second item weights, first and second device weights, based on the first and second device prediction results. The first and second item weights depend on first and second item values, respectively, of the first and second device prediction results. The first device weight corresponds to the first prediction device, and the second device weight corresponds to the second prediction device. The predictor generates an ensemble result of the first and second device prediction results, based on the first and second item weights and the first and second device weights.

18 Claims, 19 Drawing Sheets

(51) Int. Cl.
*G06F 18/25* (2023.01)
*G06N 3/045* (2023.01)
*G06N 3/063* (2023.01)
*G06N 20/20* (2019.01)
*G06V 10/82* (2022.01)

(52) U.S. Cl.
CPC .............. *G06N 3/08* (2013.01); *G06N 20/20* (2019.01); *G06V 10/82* (2022.01)

(56) References Cited

U.S. PATENT DOCUMENTS

| | | | | |
|---|---|---|---|---|
| 2008/0228680 | A1* | 9/2008 | Chen | G06N 3/045 706/21 |
| 2010/0005043 | A1* | 1/2010 | Yamashita | G06N 20/00 706/47 |
| 2013/0151516 | A1 | 6/2013 | Park | |
| 2013/0275349 | A1* | 10/2013 | Tashiro | G16B 25/10 706/12 |
| 2014/0195268 | A1 | 7/2014 | Lim et al. | |
| 2016/0358099 | A1* | 12/2016 | Sturlaugson | G06N 5/043 |
| 2017/0147777 | A1 | 5/2017 | Kim | |
| 2017/0357760 | A1 | 12/2017 | Han et al. | |
| 2019/0034589 | A1* | 1/2019 | Chen | G06N 3/044 |
| 2019/0096526 | A1* | 3/2019 | Hirsch | G16H 20/40 |
| 2019/0236148 | A1* | 8/2019 | DeFelice | G06F 40/216 |
| 2020/0342048 | A1* | 10/2020 | Mizoguchi | G06Q 10/04 |

FOREIGN PATENT DOCUMENTS

| | | |
|---|---|---|
| KR | 10-2017-0061222 A | 6/2017 |
| KR | 10-2017-0140757 A | 12/2017 |
| KR | 10-2018-0061552 A | 6/2018 |
| KR | 10-2018-0099193 A | 9/2018 |

\* cited by examiner

DEVICE FOR ENSEMBLING DATA RECEIVED FROM PREDICTION DEVICES AND OPERATING METHOD THEREOF

CROSS-REFERENCE TO RELATED APPLICATIONS

This U.S. non-provisional patent application claims priority under 35 U.S.C. § 119 of Korean Patent Application Nos. 10-2018-0156420, filed on Dec. 6, 2018, and 10-2019-0124616, filed on Oct. 8, 2019, respectively, the entire contents of which are hereby incorporated by reference.

BACKGROUND

Embodiments of the inventive concept relate to a processing of data, and more particularly, relate to a device for ensembling data received from prediction devices and an operating method thereof.

To lead a healthy life, there is a demand for predicting a future health condition in addition to treating current diseases. To predict the future health condition, there is an increasing demand for analyzing big data to diagnose diseases or to predict future disease risks. The development of industrial technology and information and communication technology are supporting a construction of the big data. In addition, technology such as artificial intelligence, which provides various services by learning electronic devices such as computers, using such big data, is emerging. In particular, to predict the future health condition, a solution of constructing a learning model using various medical data or health data is being proposed.

Larger data are more beneficial for accurate predictions, but it may be difficult to share data among various medical institutions for a variety of reasons, including ethical, legal, and personal privacy issues. For these reasons, it is actually difficult to construct the big data of the medical data integrated into one. As solutions to the problems unique to medical data, a solution is being sought, which learns an individual prediction model from data that are individually constructed in various medical institutions and uses these prediction models to predict the future health condition for patients.

SUMMARY

Embodiments of the inventive concept provide a device for ensembling data received from a plurality of prediction devices and a method of operating the same capable of ensuring reliability, accuracy, and efficiency of a future health condition prediction.

According to an exemplary embodiment, a device for ensembling data received from a plurality of prediction devices includes a data manager, and a learner. The data manager provides raw learning data to a first prediction device and a second prediction device, receives a first device prediction result corresponding to the raw learning data from the first prediction device, and receives a second device prediction result corresponding to the raw learning data from the second prediction device. The learner adjusts a weight group of a prediction model for generating first item weights depending on first item values of the first and second device prediction results, second item weights depending on second item values of the first and second device prediction results, a first device weight corresponding to the first prediction device, and a second device weight corresponding to the second prediction device, based on the first device prediction result and the second device prediction result. The weight group includes a first parameter for generating the first item weights, a second parameter for generating the second item weights, and a third parameter for generating the first and second device weights.

In an embodiment, the learner may include an item weight calculator, a device weight calculator, a weight applicator, and a weight controller. The item weight calculator may calculate the first item weights, based on the first item values and the first parameter and calculate the second item weights, based on the second item values and the second parameter. The device weight calculator may calculate the first and second device weights, based on the first and second device prediction results and the third parameter. The weight applicator may apply the first and second item weights and the first device weight to the first device prediction result to generate a first result, and apply the first and second item weights and the second device weight to the second device prediction result to generate a second result. The weight controller may adjust the first parameter, the second parameter, and the third parameter, based on the first and second results.

In an embodiment, the learner further includes an item classifier that groups the first item values of the first and second device prediction results to output to the item weight calculator, and groups the second item values of the first and second device prediction results to output to the item weight calculator.

In an embodiment, the weight group further includes a fourth parameter for generating an ensemble result having the same dimension as the first result or the second result. The learner further includes a result calculator that generates the ensemble result, based on the first and second results and the fourth parameter. The weight controller may adjust the first to fourth parameters, based on the ensemble result. The weight controller may adjust the first to fourth parameters until the ensemble result is within a reference error from a preset comparison result.

In an embodiment, the learner includes an item weight calculator, an item weight applicator, a device weight calculator, a device weight applicator, and a weight controller. The item weight calculator may calculate the first item weights, based on the first item values and the first parameter and calculate the second item weights, based on the second item values and the second parameter. The item weight applicator may apply the first item weights to the first item values and apply the second item weights to the second item values to generate an intermediate result. The device weight calculator may calculate the first and second device weights, based on the intermediate result and the third parameter. The device weight applicator may apply the first device weight to a value corresponding to the first device prediction result among the intermediate result to generate a first result, and apply the second device weight to a value corresponding to the second device prediction result among the intermediate result to generate a second result. The weight controller may adjust the first parameter, the second parameter, and the third parameter, based on the first and second results.

In an embodiment, the weight group further includes a fourth parameter for generating an ensemble result having the same dimension as the first result or the second result. The learner further includes a result calculator that generates the ensemble result, based on the first and second results and the fourth parameter. The weight controller may adjust the first to fourth parameters, based on the ensemble result.

In an embodiment, the data manager further receives first state information of a first prediction model for generating the first device prediction result from the first prediction device, and further receives second state information of a second prediction model for generating the second device prediction result from the second prediction device. The learner may adjust the weight group, further based on the first state information and the second state information. In an embodiment, the data manager or the learner may convert a dimension of the first state information to be the same as a dimension of the first device prediction result, and convert a dimension of the second state information to be the same as a dimension of the second device prediction result.

In an embodiment, the data manager further receives first state information for generating the first device prediction result from the first prediction device. The data manager or the learner may generate second state information corresponding to the second prediction device, based on the second device prediction result. The learner may adjust the weight group, further based on the first state information and the second state information. In an embodiment, the data manager or the learner may generate first mask information corresponding to the first device prediction result, based on the first state information, and second mask information corresponding to the second device prediction result, based on the second state information. The learner may adjust the weight group, further based on the first mask information and the second mask information.

In an embodiment, the data manager may further receive state information for generating the first device prediction result from the first prediction device. The learner may calculate first intermediate item weights, based on the state information and the first device prediction result, calculate second intermediate item weights, based on the second device prediction result, and merge the first and second intermediate item weights to generate the first and second item weights.

According to an exemplary embodiment, a device for ensembling data received from a plurality of prediction devices includes a data manager, and a predictor. The data manager provides time series data to a first prediction device and a second prediction device, receives a first device prediction result corresponding to the time series data from the first prediction device, and receives a second device prediction result corresponding to the time series data from the second prediction device. The predictor generates first item weights depending on first item values of the first and second device prediction results, second item weights depending on second item values of the first and second device prediction results, a first device weight corresponding to the first prediction device, and a second device weight corresponding to the second prediction device, based on the first and second device prediction results, and generates an ensemble result of the first and second device prediction results, based on the first and second item weights and the first and second device weights.

In an embodiment, the device may further include storage in which a weight group of a prediction model including a first parameter for generating the first item weights, a second parameter for generating the second item weights, and a third parameter for generating the first and second device weights, is stored. The predictor may calculate the first item weights, based on the first item values and the first parameter, calculate the second item weights, based on the second item values and the second parameter, and calculate the first and second device weights, based on the first and second device prediction results and the third parameter.

In an embodiment, the predictor includes a preprocessor, an item weight calculator, and a device weight calculator. The preprocessor may preprocess the first and second item values of the first and second device prediction results. The item weight calculator may calculate the first item weights, based on the preprocessed first item values, and calculate the second item weights, based on the preprocessed second item values. The device weight calculator may calculate the first and second device weights, based on the preprocessed first and second device prediction results.

In an embodiment, the predictor includes a preprocessor, an item weight calculator, an item weight applicator, a device weight calculator, a device weight applicator, and a result calculator. The preprocessor may preprocess the first and second item values of the first and second device prediction results. The item weight calculator may calculate the first item weights, based on the preprocessed first item values, and calculate the second item weights, based on the preprocessed second item values. The item weight applicator may apply the first item weights to the preprocessed first item values and apply the second item weights to the preprocessed second item values, to generate an intermediate result. The device weight calculator may calculate the first and second device weights, based on the intermediate result. The device weight applicator may apply the first device weight to a value corresponding to the first device prediction result among the intermediate result, to generate a first result, and apply the second device weight to a value corresponding to the second device prediction result among the intermediate result, to generate a second result. The result calculator may generate the ensemble result having the same dimension as the first result or the second result, based on the first and second results.

In an embodiment, the data manager may further receive first state information of a first prediction model for generating the first device prediction result from the first prediction device, and may further receive second state information of a second prediction model for generating the second device prediction result from the second prediction device. The predictor may generate the ensemble result, further based on the first state information and the second state information.

According to an exemplary embodiment, a method of operating a device for ensembling data received from a plurality of prediction devices, the method includes providing time series data and a prediction request to a first prediction device and a second prediction device, receiving a first device prediction result of the time series data that is responsive to the prediction request, from the first prediction device, receiving a second device prediction result of the time series data that is responsive to the prediction request, from the second prediction device, preprocessing the first and second device prediction results, generating first item weights that depend on first item values of the first and second device prediction results, based on the preprocessed first and second device prediction results, generating second item weights that depend on second item values of the first and second device prediction results, based on the preprocessed first and second device prediction results, generating a first device weight corresponding to the first prediction device and a second device weight corresponding to the second prediction device, based on the preprocessed first and second device prediction results, generating a first result by applying the first and second item weights and the first device weight to the preprocessed first device prediction result, generating a second result by applying the first and second item weights and the second device weight to the preprocessed second device prediction result, and generating an ensemble result, based on the first result and the second result.

In an embodiment, the method may further include adjusting a parameter for generating the first and second item weights and the first and second device weights, based on the ensemble result.

In an embodiment, the generating of the first result may include multiplying a first item value of the preprocessed first device prediction result, a first item weight corresponding to the first device prediction result among the first item weights, and the first device weight, and multiplying a second item value of the preprocessed first device prediction result, a second item weight corresponding to the first device prediction result among the second item weights, and the first device weight. In an embodiment, the generating of the second result may include multiplying a first item value of the preprocessed second device prediction result, a first item weight corresponding to the second device prediction result among the first item weights, and the second device weight, and multiplying a second item value of the preprocessed second device prediction result, a second item weight corresponding to the second device prediction result among the second item weights, and the second device weight.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Embodiments of the inventive concept will be described below in more detail with reference to the accompanying drawings. In the following descriptions, details such as detailed configurations and structures are provided merely to assist in an overall understanding of embodiments of the inventive concept. Modifications of the embodiments described herein can be made by those skilled in the art without departing from the spirit and scope of the inventive concept.

Figure 1:
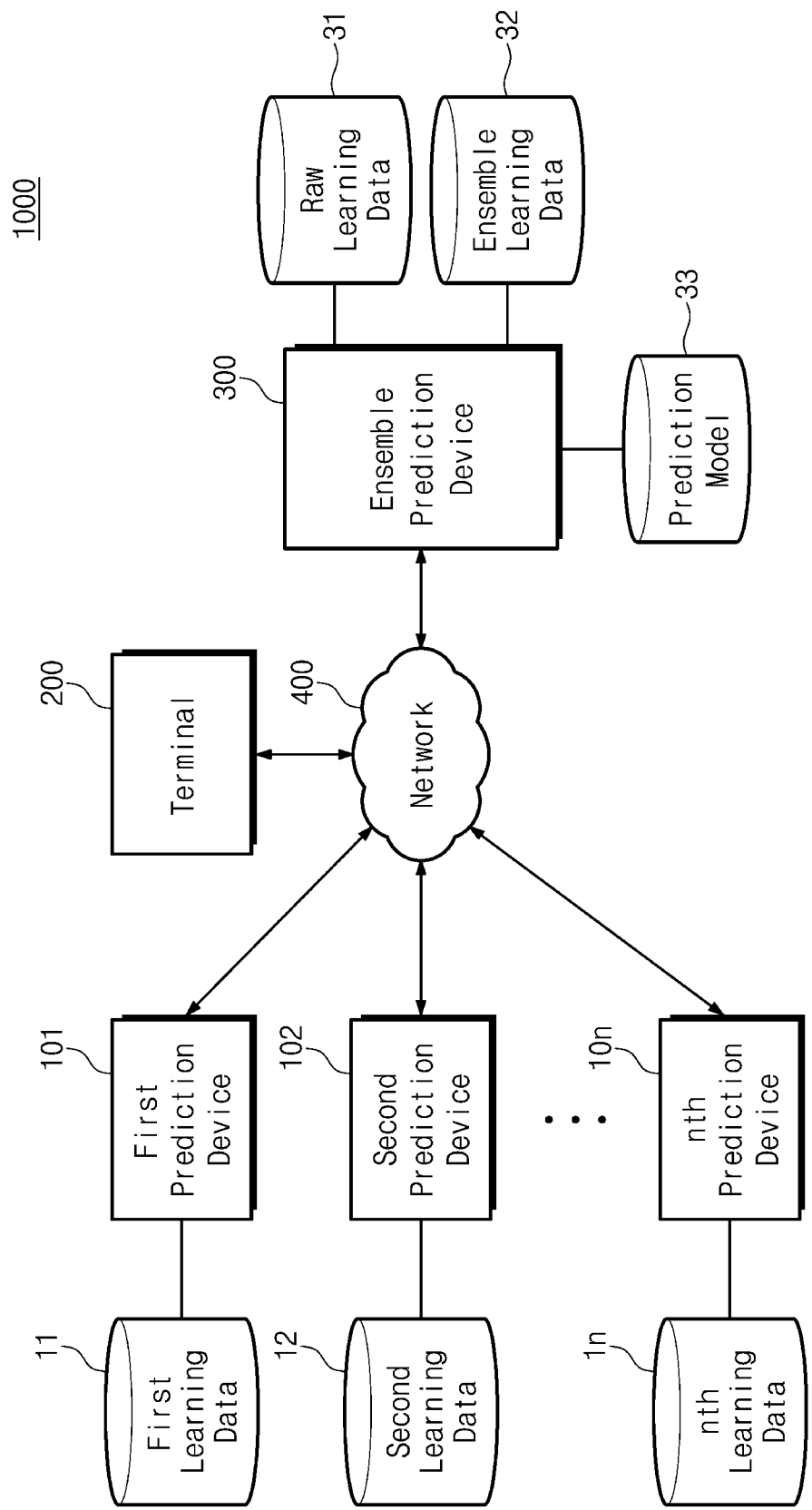
FIG. 1 is a diagram illustrating a health condition prediction system according to an embodiment of the inventive concept.

FIG. 1 is a diagram illustrating a health condition prediction system according to an embodiment of the inventive concept. Referring to FIG. 1, a health condition prediction system 1000 includes first to nth prediction devices 101 to 10n, a terminal 200, an ensemble prediction device 300, and a network 400. For convenience of description, although the number of prediction devices 101 to 10n is illustrated as n, the number of health prediction devices is not limited thereto.

Each the first to nth prediction devices 101 to 10n may predict a health condition of a user, based on an individually constructed prediction model. Here, the prediction model may be a structure that is modeled to predict the health condition at a future time, using time series medical data. Each the first to nth prediction devices 101 to 10n may generate and learn the prediction model, using first to nth learning data 11 to 1n.

Each the first to nth prediction devices 101 to 10 n may be provided to different medical institutions or public institutions. The first to nth learning data 11 to 1n may be individually databased to generate and learn the prediction model of each of the institutions. The different medical institutions or public institutions may individually learn the prediction model and apply the time series medical data of the user to the prediction model that is constructed based on the learning, thereby predicting the health condition of the user at the future time.

Each the first to nth prediction devices 101 to 10n may receive at least a portion of raw learning data 31 from the ensemble prediction device 300 through the network 400. Here, the raw learning data 31 may include the time series medical data for learning a prediction model 33 that is constructed in the ensemble prediction device 300.

The first to nth prediction devices 101 to 10 n may generate the first to nth device prediction results by applying the raw learning data 31 to the constructed prediction model, respectively. Here, the first to nth device prediction results may be understood as result data for which the first to nth prediction devices 101 to 10n respectively predict a future health condition corresponding to the raw learning data 31. The first to nth device prediction results may be provided to the ensemble prediction device 300 through the network 400.

Since the first to nth device prediction results are generated based on different prediction models, they may have different data values. This is because each of the first to nth prediction devices 101 to 10n learns and constructs the prediction model, based on different time series medical data, that is, different first to nth learning data 11 to 1n. Due to the sensitive nature of the medical data, such as ethical issues, legal issues, personal privacy issues, etc. it is difficult to share data among medical institutions and make the big data. Accordingly, the first to nth prediction devices 101 to 10n separately construct the prediction model, but as the ensemble prediction device 300 may ensemble the prediction results of the raw learning data 31 from the first to nth prediction devices 101 to 10n, a future health prediction in which a variety of data learning is considered may be possible.

The first to nth prediction devices 101 to 10 n analyze the time series data TD, based on different prediction models. In environments where data are difficult to share and exchange due to the sensitivity of medical data, medical institutions or hospitals learn the prediction model to predict the future health condition from internally constructed database. Due to a nature of a medical environment, the time series medical data may be focused on a specific medical institution. Specialty hospitals for specific diseases may collect a medical data focused on the specific diseases. Accordingly, an accuracy of the prediction model constructed by medical institutions may be focused according to the specific diseases. In such a situation, the health condition prediction system 1000 of the inventive concept may have the same effect as collaborating by generating results by using prediction models constructed in different ways and ensembling the results.

The terminal 200 may provide a request signal for the future health prediction or a learning of the prediction model 33 of the patient(s). The terminal 200 may be an electronic device capable of providing a request signal such as a smartphone, a desktop, a laptop, a wearable device, etc. For example, the terminal 200 may provide the request signal to the ensemble prediction device 300 through the network 400. In this case, the prediction model 33 of the ensemble prediction device 300 may be learned. Alternatively, the health condition of the user may be diagnosed or the future health condition may be predicted by the first to nth prediction devices 101 to 10n and the ensemble prediction device 300.

The ensemble prediction device 300 learns the prediction model 33, using the first to nth device prediction results. Here, the prediction model 33 may be a modeled structure for finally predicting the future health condition, by ensembling the device prediction results of each of the first to nth prediction devices 101 to 10n predicting the health condition, as described above. The ensemble prediction device 300 may transmit at least a portion of the raw learning data 31 to the first to nth prediction devices 101 to 10n together with the prediction request. The ensemble prediction device 300 may receive first to nth device prediction results that are the results of prediction of the time series medical data by each of the first to nth prediction devices 101 to 10n, in response to the prediction request. The ensemble prediction device 300 may generate ensemble learning data 32 by integrating the first to nth device prediction results. The ensemble prediction device 300 learns the prediction model 33, based on the ensemble learning data 32.

The raw learning data 31 may include the time series medical data representing the health condition of the user, which are generated by a diagnosis, a treatment, an inspection, or a dosage prescription. In exemplary embodiments, the time series medical data may be electronic medical record (EMR) data or personal health record (PHR) data. The raw learning data 31 may include the time series medical data collected by institutions on which the ensemble prediction device 300 is implemented. The raw learning data 31 may be integratedly managed by the ensemble prediction device 300. The raw learning data 31 may be databased in a server or a storage medium of the ensemble prediction device 300.

The ensemble learning data 32 may include first to nth device prediction results. To learn the prediction model 33, the ensemble learning data 32 may include identification information of the first to nth prediction devices 101 to 10n that generate the first to nth device prediction results. The identification information may be used to generate a device weight to be described later. The ensemble learning data 32 may be integratedly managed by the ensemble prediction device 300. The ensemble learning data 32 may be databased in the server or the storage medium of the ensemble prediction device 300.

The prediction model 33 may be understood as an ensemble model for ensembling the prediction results for each device (first to nth device prediction results) that are generated from the first to nth prediction devices 101 to 10n. The ensemble model may be a structure for processing the first to nth device prediction results, instead of simply merging the prediction results, to have the same dimension as the first to nth device prediction results. The prediction model 33 may be managed in a weight group such that an artificial neural network for such processing is implemented. The weight group may be databased in the server or the storage medium of the ensemble prediction device 300. Details of the weight group will be described later. In addition, details of how the ensemble prediction device 300 learns the prediction model 33 and generates the ensemble result, using the learned prediction model 33 will be described later.

The network 400 may be configured to perform data communication among the first to nth prediction devices 101 to 10n, the terminal 200, and the ensemble prediction device 300. The first to nth prediction devices 101 to 10n, the terminal 200, and the ensemble prediction device 300 may transmit and receive data through the network 400 by wiredly or wirelessly.

Figure 2:
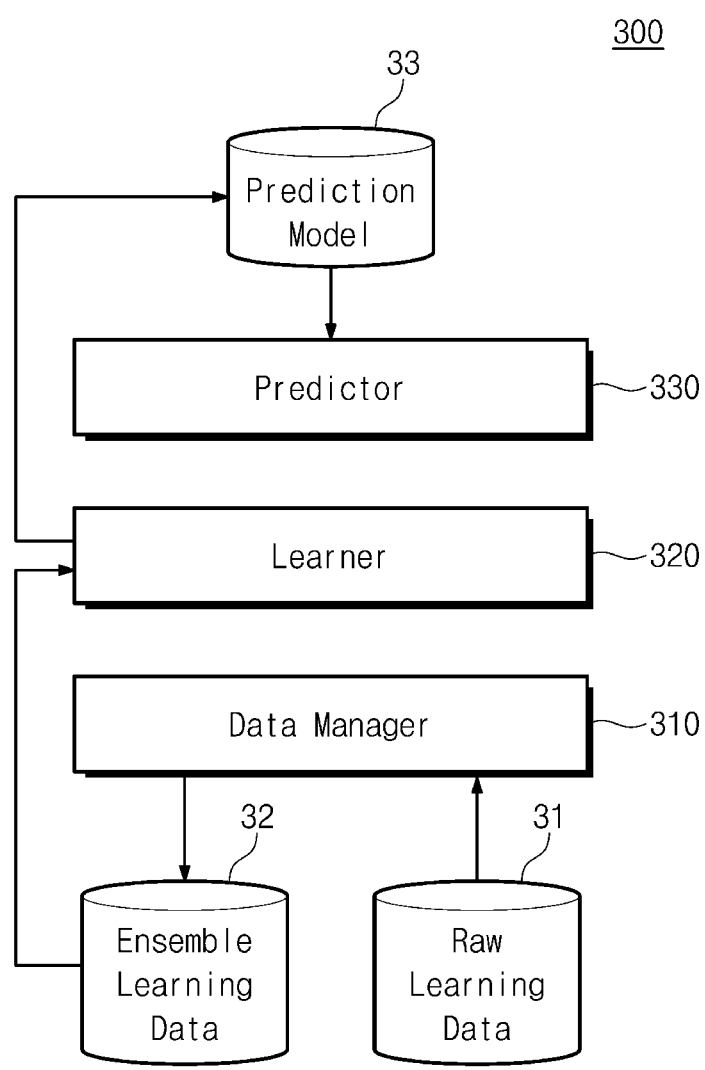
FIG. 2 is an exemplary block diagram of an ensemble prediction device in FIG. 1.

FIG. 2 is an exemplary block diagram of an ensemble prediction device in FIG. 1. The ensemble prediction device 300 of FIG. 2 will be understood as an exemplary configuration for learning the prediction model 33 that generates the ensemble result by analyzing the prediction results for each device that are received from the first to nth prediction devices 101 to 10n of FIG. 1, or for generating the ensemble result. Referring to FIG. 2, the ensemble prediction device 300 includes a data manager 310, a learner 320, and a predictor 330.

The data manager 310, the learner 320, and the predictor 330 may be implemented in hardware, or may be implemented in firmware, software, or a combination thereof. In one example, software (or firmware) may be loaded into a memory (not illustrated) included in the ensemble prediction device 300 and executed by a processor (not illustrated). For example, the data manager 310, the learner 320, and the predictor 330 may be implemented in hardware of a dedicated logic circuit such as a field programmable gate array (FPGA) or an application specific integrated circuit (ASIC).

The data manager 310 may manage the raw learning data 31 and the ensemble learning data 32. To learn the prediction model 33, the data manager 310 may provide the time series data included in the raw learning data 31 to the first to nth prediction devices 101 to 10n of FIG. 1. The data manager 310 may output the time series data to the first to nth prediction devices 101 to 10n together with the prediction request. In this case, the first to nth prediction devices 101 to 10n may generate the first to nth device prediction results for the time series data in response to the prediction request, using a separately implemented prediction model. Each of the first to nth device prediction results may be the prediction result of the future health condition that is determined using the time series medical data.

The data manager 310 may receive the first to nth prediction results from the first to nth prediction devices 101 to 10n. The first to nth prediction results may be merged into the ensemble learning data 32 and managed. Here, the merging may be understood as grouping results by adding the identification information, etc. without modifying the information unique to the first to nth prediction results.

The learner 320 may learn the prediction model 33, based on the ensemble learning data 32. The prediction model 33 may include an analysis model for calculating the ensemble result that is a future final prediction result generated by analyzing the prediction results for each device. The prediction model 33 may be constructed through the artificial neural network or a deep learning machine learning.

The learner 320 may preprocess the ensemble learning data 32 into data suitable for learning. In one example, the preprocessing may include a normalization operation that transforms the ensemble learning data 32 into a specific numerical range (e.g., a range from 0 to 1), an encoding operation for digitization, etc.

The learner 320 may generate and adjust the weight group of the prediction model 33 by analyzing the preprocessed ensemble learning data. The weight group may be an artificial neural network structure of the prediction model 33 or a set of all parameters included in the neural network. The learner 320 may generate the ensemble result through analysis of the preprocessed ensemble learning data. The learner 320 may adjust the weight group of the prediction model 33 such that the generated ensemble result has an expected comparison result (or within a reference error from the comparison result). The comparison result may be an actual value and may be set in the ensemble prediction device 300 in advance. The adjusted weight group may be applied in the prediction model 33 and managed by the ensemble prediction device 300.

The predictor 330 may analyze device prediction results corresponding to a specific user and generate an ensemble result, based on the prediction model 33 that is learned from the learner 320 and the weight group. The data manager 310 may provide the time series data (target data) of the specific user to the first to nth prediction devices 101 to 10n together with the prediction request. The first to nth prediction devices 101 to 10n may generate the first to nth device prediction results in response to the prediction request. The predictor 330 may preprocess the first to nth device prediction results and analyze the preprocessed results through the weight group of the prediction model 33. In addition, the ensemble result may be provided to the terminal 200 of FIG. 1.

Figure 3:
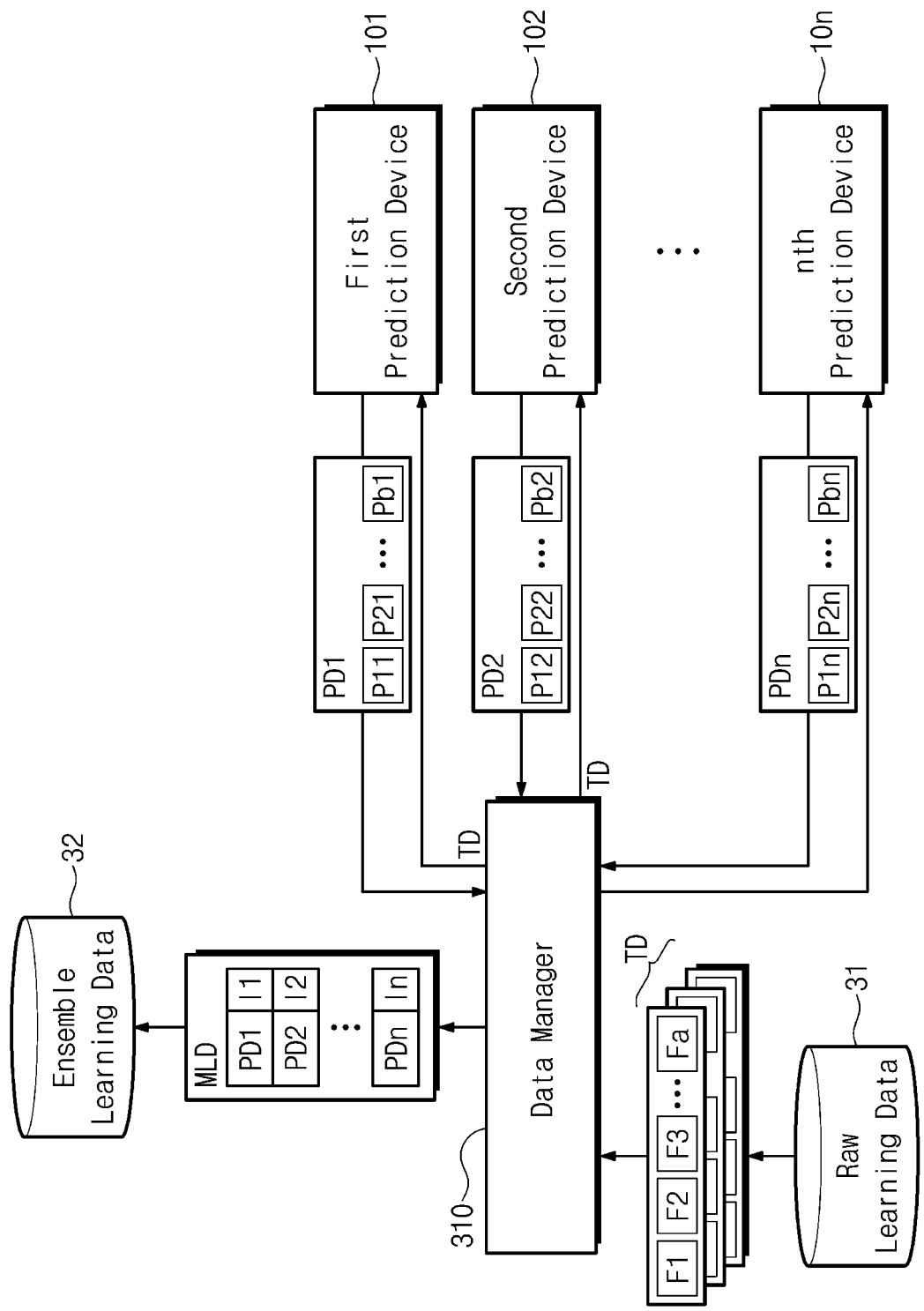
FIG. 3 is an exemplary diagram for describing an operation of a data manager in FIG. 2.

FIG. 3 is an exemplary diagram for describing an operation of a data manager in FIG. 2. Referring to FIG. 3, the data manager 310 receives the time series data TD. In a learning operation of the prediction model 33, the time series data TD may be at least a portion of the raw learning data 31 that are managed in a server (not illustrated) or storage (not illustrated). In a prediction operation of a future condition using the learned prediction model 33, the time series data TD may be provided from the terminal 200 of FIG. 1 or may be generated or collected by the ensemble prediction device 300.

The time series data TD may be a data set having a temporal order, recorded over time. The time series data TD may include at least one of features F1 to Fa that correspond to each of a plurality of times listed in time series. For example, the time series data TD may include the time series medical data indicating the health condition of the user generated by the diagnosis, the treatment, or the dosage prescription in medical institutions, like an electronic medical record (EMR). The features F1 to Fa may represent values of each of items diagnosed, inspected, or prescribed. In one example, the item may represent various health indicators, such as blood pressure, blood sugar, cholesterol levels, or body weight. For clarity of explanation, the time series medical data has been described as an example, but a type of the time series data TD is not limited thereto. The time series data (TD) may be generated and collected in various fields such as entertainment, retail, smart management, etc.

The data manager 310 may provide the time series data TD to the first to nth prediction devices 101 to 10n together with the prediction request. In response to the prediction request, the first to nth prediction devices 101 to 10n may analyze the time series data TD, using the individually constructed prediction model. As a result of the analysis, the first to nth prediction devices 101 to 10n may generate the first to nth device prediction results PD1 to PDn, respectively. The first to nth device prediction results PD1 to PDn may indicate the health condition with respect to a specific future time.

Each of the first to nth device prediction results PD1 to PDn may include item values P11 to Pb1, P12 to Pb2, and P1n to Pbn for the specific future time. The item values may be values representing a health indicator for the future time, and may include, for example, prediction values such as blood pressure, cholesterol level, or weight, a diagnosis/disease code, a label, etc. The number of items of the time series data TD may be the same or different from the number of items of each of the first to nth device prediction results PD1 to PDn. For example, the time series data TD may include "a" number of features, and each of the first to nth device prediction results PD1 to PDn may include "b" number of item values.

The data manager 310 may receive and merge the first to nth device prediction results PD1 to PDn. The data manager 310 may generate merged data MLD that are grouped by adding the first to nth identification information I1 to In to the first to nth device prediction results PD1 to PDn, respectively. The first to nth identification information I1 to In may be information for distinguishing the prediction devices that generate each of the first to nth device prediction results PD1 to PDn. A different weight (device weight) may be used by each device when learning or using the prediction model 33. Although the first to nth identification information I1 to In will be described later, the device weight may be applied to the first to nth device prediction results PD1 to PDn, based on the first to nth identification information I1 to In.

In the learning operation of the prediction model 33, the merged data MLD may be included in the ensemble learning data 32 that are managed in a server (not illustrated) or storage (not illustrated), and may be provided to the learner 320 of FIG. 2. In the prediction operation of the future condition, using the learned prediction model 33, the merged data MLD may be provided to the predictor 330 of FIG. 2.

Figure 4:
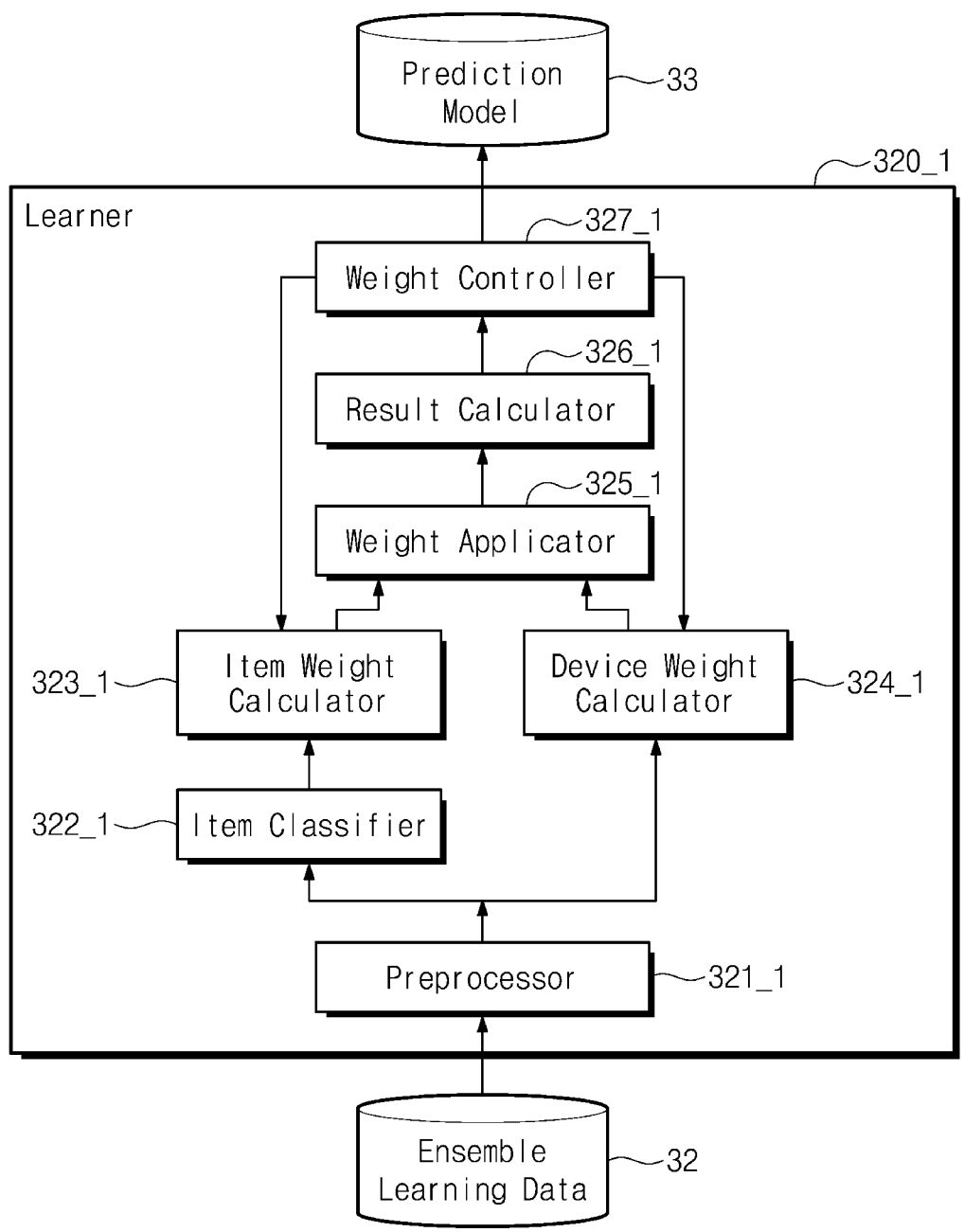
FIG. 4 is an exemplary block diagram of a learner of FIG. 2.

FIG. 4 is an exemplary block diagram of a learner of FIG. 2. A learner 320_1 of FIG. 4 will be understood as an exemplary configuration for learning the prediction model 33 and determining the weight group, based on the prediction results received from the plurality of prediction devices. The learner 320_1 includes a preprocessor 321_1, an item classifier 322_1, an item weight calculator 323_1, a device weight calculator 324_1, a weight applicator 325_1, a result calculator 326_1, and a weight controller 327_1. As described above, each components included in the learner 320_1 may be implemented in hardware, or may be implemented in firmware, software, or a combination thereof.

The preprocessor 321_1 may preprocess the ensemble learning data 32 into data suitable for learning. As described above, the ensemble learning data 32 may include the device prediction results that are received from the plurality of prediction devices. In one example, the preprocessor 321_1 may convert the item values of the device prediction results into the specific numerical range (e.g., a range from 0 to 1). As an example, the preprocessor 321_1 may convert the item values into a numeric type when the item values are in a non-numeric type. The non-numeric type may include a code type or a categorical type (e.g., L3011, E2014, K3095, etc.). For example, the EMR data may have a data type that are defined according to a specific disease, the prescription, or the inspection, and the device prediction results may have values in which both numeric and non-numeric types are mixed. The preprocessor 321_1 may digitize non-numeric values (e.g., 0010, 1001, 1101, etc.) and normalize the digitized non-numeric values within the specific numeric range.

The preprocessor 321_1 converts the device prediction results into a type suitable for learning of the prediction model 33, but does not change feature information itself indicated by the item values to be unknown. Accordingly, it will be understood that, for convenience of explanation below, the preprocessed device prediction results may be consistently stated as the device prediction results. In the following, unless otherwise specified, the device prediction result will be a concept including the preprocessed device prediction result. The preprocessing operation is exemplary, and when the prediction results that are received from the plurality of prediction devices are suitable for learning of the prediction model 33, a separate preprocessing process may not be required.

The item classifier 322_1 may separate and group the preprocessed ensemble learning data by items. As described in FIG. 3, the device prediction result includes a plurality of item values. The item classifier 322_1 may group values having the same item. For example, the item classifier 322_1 may classify a first item value P11 of a first device prediction result PD1, a first item value P12 of a second device prediction result PD2, and a first item value P1n of the nth device prediction result PDn, in FIG. 3, into one group. The separated item values are input to the item weight calculator 323_1.

The item weight calculator 323_1 analyzes the item values grouped from the item classifier 322_1. The item weight calculator 323_1 may analyze item values separately for each group. The item weight calculator 323_1 may generate item weights corresponding to the item values, based on the parameters (item parameter) of the prediction model 33 for generating the item weight. These item parameters are included in the weight group. As described in FIG. 3, when the number of item values is bXn, the number of item weights may be bXn.

The item weights depend on the size of the item values. The item weight may be understood as an index for determining the importance of each of the item values for predicting the future health condition. The item weight refers to an importance of the prediction device (institution) involved in the ensemble result of a specific item, and may be understood as a local importance of each item. For example, the item weight calculator 323_1 may generate item weights such that the ensemble result attends to items generated by a specified prediction device, using an attention mechanism.

The device weight calculator 324_1 analyzes characteristics of the prediction devices, based on the device prediction results. The device weight calculator 324_1 may generate the device weights corresponding to the prediction devices, respectively, based on the parameters (device parameter) of the prediction model 33 for generating the device weights. These device parameters are included in the weight group. As described in FIG. 3, when the number of prediction device is 'n', the number of item weights may be 'n'.

The device weight may be understood as an indicator for determining a global importance of the prediction device (institution) with respect to an accuracy or a reliability of the device prediction results themselves. In exemplary embodiments, the device weight calculator 324_1 may generate the device weights such that the ensemble result attends to the specified prediction device, using the attention mechanism.

The weight applicator 325_1 may apply the item weights and the device weights to device prediction results. As a result of the applying, the weight applicator 325_1 may generate a learning result obtained by applying both an overall reliability of each of the prediction devices and the reliability of a specific field (item) of each of the prediction devices. For example, the weight applicator 325_1 may multiply a first item value of the first prediction device by an item weight (first item weight) corresponding to the first item value and a device weight (first device weight) corresponding to the first prediction device. For example, the weight applicator 325_1 may multiply the first item value of the second prediction device by an item weight (second item weight) corresponding to the first item value and a device weight (second device weight) corresponding to the second prediction device. For example, the weight applicator 325_1 may multiply a second item value of the first prediction device by an item weight (third item weight) corresponding to the second item value and the first device weight.

The result calculator 326_1 may generate the ensemble result, based on the learning result generated from the weight applicator 325_1. The learning result is a result obtained by applying the item weight and the device weight to the item values included in the device prediction results. Thus, the learning result may have a dimension of the size of merging all of the device prediction results. The result calculator 326_1 may generate an ensemble result having the same dimension as one device prediction result. The result calculator 326_1 may generate the ensemble result, based on the parameters (ensemble parameter) of the prediction model 33. This ensemble parameter is included in the weight group. The number of item values that are included in the ensemble result may be equal to the number of item values included in one device prediction result.

The weight controller 327_1 may adjust the parameters included in the weight group, based on the ensemble result. The parameters here include the item parameter, device parameter, and ensemble parameter described above. The weight controller 327_1 may determine whether the ensemble result corresponds to a comparison result that is a desired actual result. The weight controller 327_1 may adjust the item parameter, the device parameter, and the ensemble parameter such that the ensemble result reaches the comparison result. Based on the adjusted item parameter, the item weight calculator 323_1 may repeatedly generate the item weight. Based on the adjusted device parameters, the device weight calculator 324_1 may repeatedly generate device weight. Based on the adjusted ensemble parameters, the result calculator 326_1 may repeatedly generate the ensemble result. This repetitive operation may be performed until the ensemble result is within a reference error from the comparison result.

Figure 5:
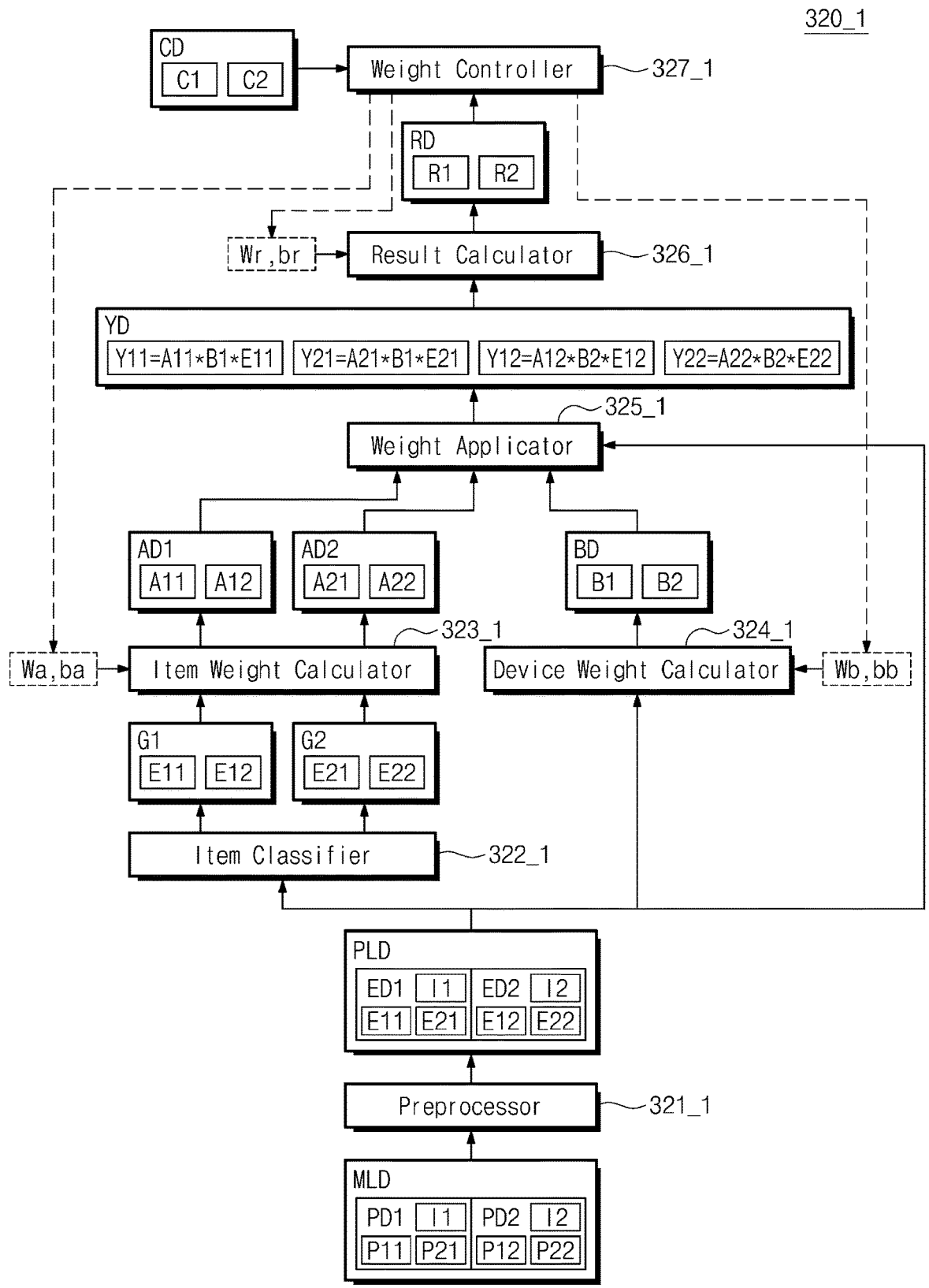
FIG. 5 is a diagram illustrating a learner of FIG. 4 in detail.

FIG. 5 is a diagram illustrating a learner of FIG. 4 in detail. Referring to FIG. 5, the learner 320_1 may include the preprocessor 321_1, the item classifier 322_1, the item weight calculator 323_1, the device weight calculator 324_1, the weight applicator 325_1, the result calculator 326_1, and the weight controller 327_1.

The learner 320_1 receives the merged data MLD described in FIG. 3. The merged data MLD includes the device prediction results PD1 and PD2, and for convenience of description, it is assumed that the first and second device prediction results PD1 and PD2 are generated from two prediction devices. The first device prediction result PD1 includes the first item value P11 corresponding to the first item and a second item value P21 corresponding to the second item. The second device prediction result PD2 includes a third item value P12 corresponding to the first item and a fourth item value P22 corresponding to the second item. For convenience of description, it is assumed that the first and second device prediction results PD1 and PD2 include values corresponding to the first item and the second item. The merged data MLD may further include first and second identification information I1 and I2 for distinguishing the first prediction device and the second prediction device.

The preprocessor 321_1 may generate preprocessed data PLD by preprocessing the merged data MLD. The preprocessor 321_1 may convert the non-numeric type values of the merged data MLD into the numeric type, and convert the first to fourth item values P11, P21, P12, and P22 into the specific numeric range. For convenience of description, the preprocessed first to fourth item values E11, E21, E12, and E22 are also referred to as the first to fourth item values below.

The item classifier 322_1 may group the preprocessed data PLD for each item. As a result, a first item value E11 and a third item value E12 corresponding to the first item may be grouped into a first group G1. A second item value E21 and a fourth item value E22 corresponding to the second item may be grouped into a second group G2.

The item weight calculator 323_1 may generate a first group weight AD1 for the first item, based on the first group G1. The item weight calculator 323_1 may generate a second group weight AD2 for the second item, based on the second group G2. The first group weight AD1 may include a first item weight A11 corresponding to the first item value E11 and a third item weight A12 corresponding to the third item value E12. The second group weight AD2 may include a second item weight A21 corresponding to the second item value E21 and a fourth item weight A22 corresponding to the fourth item value E22.

The item weight calculator 323_1 may generate the item weights A11, A21, A12, and A22 such that the ensemble result focuses on the item value of the specified prediction device in the specific item, using the attention mechanism. In detail, the item weight calculator 323_1 may analyze the item values by separating the first group G1 and the second group G2 through the artificial neural network. The artificial neural network may analyze the first group G1 or the second group G2, based on a weight Wa and a bias ba. The weight Wa and the bias ba are included in the weight group of the above described prediction model 33 and correspond to the item parameter.

The item weight calculator 323_1 may generate the first group weight AD1 and the second group weight AD2 by applying each of the first group G1 and the second group G2 to a softmax function. In this case, the weight Wa and the bias ba may be applied to the corresponding function. In one example, the item weight calculator 323_1 may generate the first group weight AD1 and the second group weight AD2 by calculating equation of AD1=softmax (tanh (Wa*G1+ba)) and equation of AD2=softmax (tanh (Wa*G2+ba)). Here, the weight Wa and the bias ba for analyzing the first group G1 may be different from the weight Wa and the bias ba for analyzing the second group G2.

The device weight calculator 324_1 may generate a device weight BD, based on the preprocessed data PLD. The device weight BD may include the first device weight B1 corresponding to the first prediction device (or the first device prediction result PD1 or ED1) and the second device weight B2 corresponding to the second prediction device (or the second device prediction result PD2 or ED2).

The device weight calculator 324_1 may generate the device weights B1 and B2 such that the ensemble result generally focuses on the prediction result of the specified device, using the attention mechanism. In detail, the device weight calculator 324_1 may analyze the item values through the artificial neural network. The artificial neural network may analyze the preprocessed data PLD, based on a weight Wb and a bias bb. The weight Wb and the bias bb are included in the weight group of the prediction model 33 as described above and correspond to the device parameters.

The device weight calculator 324_1 may generate the device weight BD by applying the preprocessed data PLD to the softmax function. In this case, the weight Wb and the bias bb may be applied to the corresponding function. In one example, the device weight calculator 324_1 may generate the device weight BD by calculating equation of BD=softmax (tanh (Wb*PLD+bb)).

The weight applicator 325_1 may apply the group weights AD1 and AD2 and the device weight BD to the preprocessed data PLD. As a result of the applying, the weight applicator 325_1 may generate a learning result YD that applies both the overall reliability of the device prediction result of each of the prediction devices and the reliability of the specific field (item) of the device prediction result of each of the prediction devices. The learning result YD may include first to fourth results Y11, Y21, Y12, and Y22 respectively corresponding to the first to fourth item values E11, E21, E12, and E22.

For example, the first result Y11 may be a result of multiplying the first item value E11 by the first item weight A11 and the first device weight B1. The second result Y21 may be a result of multiplying the second item value E21 by the second item weight A21 and the first device weight B1. The third result Y12 may be a result of multiplying the third item value E12 by the third item weight A12 and the second device weight B2. The fourth result Y22 may be a result of multiplying the fourth item value E22 by the fourth item weight A22 and the second device weight B2.

The result calculator 326_1 may generate an ensemble result RD, based on the learning result YD. The ensemble result RD may include a first prediction result R1 corresponding to the first item and a second prediction result R2 corresponding to the second item. The result calculator 326_1 may reduce the dimension of the learning result YD such that the ensemble result RD has one number corresponding to the first item and one number corresponding to the second item.

The result calculator 326_1 may analyze the learning result YD through the artificial neural network. The artificial neural network may analyze the learning result YD, based on a weight Wr and a bias br. The weight Wr and the bias br are included in the weight group of the prediction model 33 as described above and correspond to the ensemble parameter. The artificial neural network layer may output data by multiplying data input based on the learning result YD by the weight Wr and adding the bias br to the multiplication result.

The weight controller 327_1 may adjust the parameters Wa, ba, Wb, bb, Wr, br included in the weight group by comparing the ensemble result RD with a comparison result CD. The comparison result CD may include a first value C1 corresponding to the first item and a second value C2 corresponding to the second item. In one example, the comparison result CD may be an actual value. The weight controller 327_1 may adjust the parameters Wa, ba, Wb, bb, Wr, br such that the ensemble result RD reaches the comparison result. Based on the adjusted parameters Wa, ba, Wb, bb, Wr, br, the preprocessed data PLD may be analyzed repeatedly.

Figure 6:
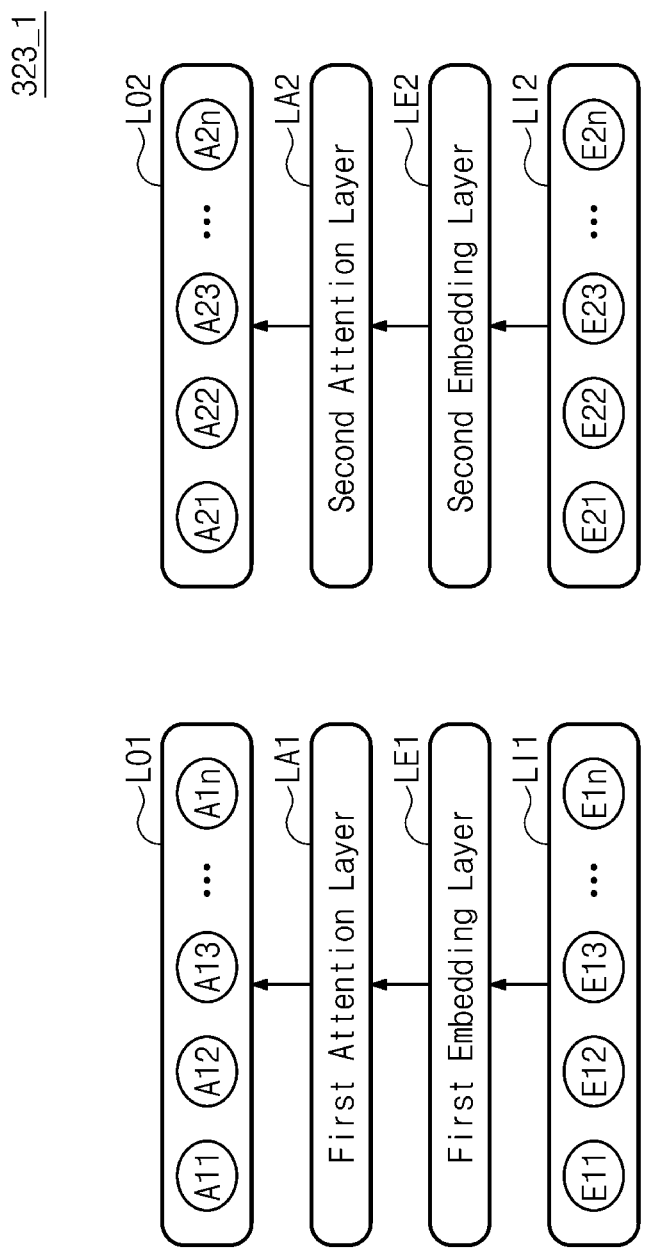
FIG. 6 is a diagram illustrating an exemplary hierarchical structure of an item weight calculator of FIGS. 4 and 5.

FIG. 6 is a diagram illustrating an exemplary hierarchical structure of an item weight calculator of FIGS. 4 and 5. FIG. 6 exemplarily illustrates an artificial neural network structure of the item weight calculator 323_1. The artificial neural network may be at least a portion of the prediction model 33 described above. As described above, the item weight calculator 323_1 may be implemented in hardware, or may be implemented in firmware, software, or a combination thereof. Referring to FIG. 6, the artificial neural network of the item weight calculator 323_1 may include first and second input layers LI1 and LI2, first and second embedding layers LE1 and LE2, and first and second attention layers LA1 and LA2, and first and second output layers LO1 and LO2.

The first input layer LI1 receives first item values E11 to E1$n$. The first item values E11 to E1$n$ may be grouped into the first group G1 by the item classifier 322_1 described with reference to FIG. 5. The second input layer LI2 receives the second item values E21 to E2$n$. The second item values E21 to E2$n$ may be grouped into the second group G2 by the item classifier 322_1 described in FIG. 5. The first group G1 and the second group G2 may be analyzed by the item weight calculator 323_1 without correlating with one another.

The first embedding layer LE1 may output an intermediate result to the first attention layer LA1 in consideration of a relationship between the first item values E11 to E1$n$. Each of the first item values E11 to E1$n$ is generated from different prediction devices. The first embedding layer LE1 may calculate the relationship between the first item values E11 to E1$n$ by applying a part of the item parameters Wa and ba described in FIG. 5 to the first item values E11 to E1$n$. The first embedding layer LE1 may include a plurality of layers. When an output of each of the layers is y and an input is x, then each of the layers may calculate $y=wa*x+ba$. The item parameters Wa and ba may indicate a connection or a network between layers. Each of the layers may be implemented as the artificial neural network in various ways, such as a fully-connected network, a recurrent neural network, and a long short term memory (LSTM). Likewise, the second embedding layer LE2 may output an intermediate result to the second attention layer LA2 in consideration of the relationship between the second item values E21 to E2$n$.

The first attention layer LA1 may calculate the first item weights A11 to A1$n$ for the first item by analyzing the intermediate result output from the first embedding layer LE1. The first attention layer LA1 may calculate the first item weights A11 to A1$n$ to be focused on the item generated by the specified prediction device, using the attention mechanism. As described with reference to FIG. 5, the first attention layer LA1 may apply a part of the item parameters Wa and ba and the softmax function to the intermediate result. Likewise, the second attention layer LA2 may calculate the second item weights A21 to A2$n$ for the second item by analyzing the intermediate result output from the second embedding layer LE2.

The first output layer LO1 may sort the first item weights A11 to A1$n$ calculated by the first attention layer LA1, and may output the first item weights A11 to A1$n$ to the weight applicator 325_1 in FIGS. 4 and 5. The second output layer LO2 may sort the second item weights A21 to A2$n$ calculated by the second attention layer LA2, and may output the second item weights A21 to A2$n$ to the weight applicator 325_1 in FIGS. 4 and 5.

Figure 7:
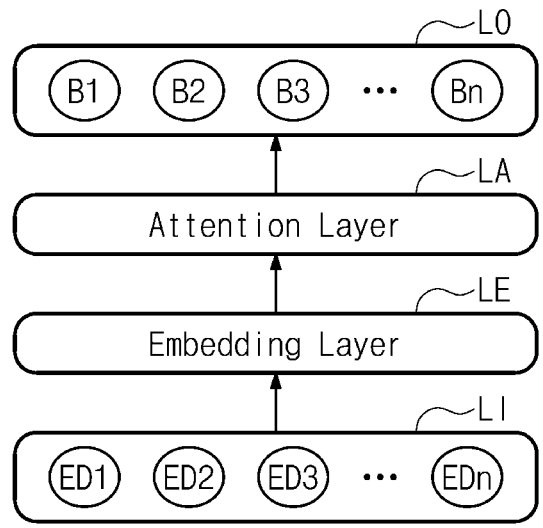
FIG. 7 is a diagram illustrating an exemplary hierarchical structure of a device weight calculator of FIGS. 4 and 5.

FIG. 7 is a diagram illustrating an exemplary hierarchical structure of a device weight calculator of FIGS. 4 and 5. FIG. 7 exemplarily illustrates the artificial neural network structure of the device weight calculator 324_1. The artificial neural network may be at least a portion of the prediction model 33 described above. As described above, the device weight calculator 324_1 may be implemented in hardware, or may be implemented in firmware, software, or a combination thereof. Referring to FIG. 7, the artificial neural network of the device weight calculator 324_1 may include an input layer LI, an embedding layer LE, an attention layer LA, and an output layer LO.

The input layer LI receives device prediction results ED1 to ED$n$. Each of the device prediction results ED1 to ED$n$ is generated from different prediction devices. Each of the device prediction results ED1 to ED$n$ includes item values. That is, all of the item values of the device prediction results ED1 to ED$n$ may be correlated with one another and analyzed by the device weight calculator 324_1.

The embedding layer LE may output the intermediate result to the attention layer LA in consideration of the relationship between the prediction devices. The embedding layer LE may calculate the relationship between the device prediction results ED1 to ED$n$ by applying a part of the device parameters Wb and bb described in FIG. 5 to the device prediction results ED1 to ED$n$. The embedding layer LE may include a plurality of layers. When the output of each of the layers is y and the input is x, each of the layers may calculate $y=wb*x+bb$. The device parameters Wb and bb may indicate a connection or a network between the layers. Each of the layers may be implemented as the artificial neural network in various ways, such as the fully-connected network, the recurrent neural network, and the long short term memory (LSTM).

The attention layer LA may calculate device weights B1 to B$n$ respectively corresponding to the prediction devices by analyzing the intermediate result output from the embedding layer LE. The attention layer LA may calculate the device weights B1 to B$n$ to be focused on the specified device prediction result, using the attention mechanism. As described in FIG. 5, the attention layer LA may apply a part of the device parameters Wb and bb and the softmax function to the intermediate result. The output layer LO may sort the calculated device weights B1 to B$n$ and output the device weights B1 to B$n$ to the weight applicator 325_1 of FIGS. 4 and 5.

Figure 8:
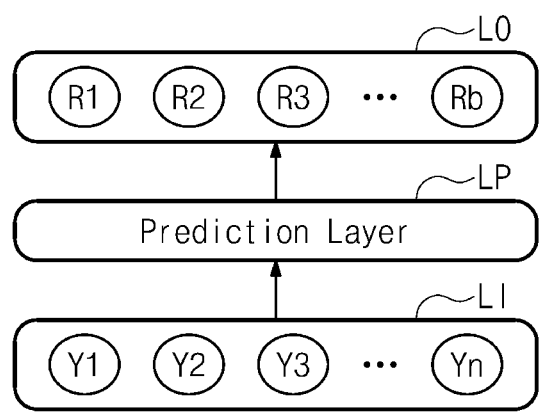
FIG. 8 is a diagram illustrating an exemplary hierarchical structure of a result calculator of FIGS. 4 and 5.

FIG. 8 is a diagram illustrating an exemplary hierarchical structure of a result calculator of FIGS. 4 and 5. FIG. 8 exemplarily illustrates the artificial neural network structure of the result calculator 326_1. The artificial neural network may be at least a portion of the prediction model 33 described above. As described above, the result calculator 326_1 may be implemented in hardware, or may be implemented in firmware, software, or a combination thereof. Referring to FIG. 8, the artificial neural network of the result calculator 326_1 may include the input layer LI, a prediction layer LP, and the output layer LO.

The input layer LI receives learning results Y1 to Yn obtained by applying the item weights and the device weights to the device prediction results. Each of the learning results Y1 to Yn corresponds to different prediction devices. Each of the learning results Y1 to Yn includes results that are obtained by applying different device weights and the same device weight to the device prediction results. Each of these results corresponds to different items. All of the learning results Y1 to Yn may be correlated with one another and analyzed by the result calculator 326_1.

The prediction layer LP may calculate a correlation between the learning results Y1 to Yn. The prediction layer LP may calculate the correlation between the learning results Y1 to Yn by applying the ensemble parameters Wr and br described in FIG. 5 to the learning results Y1 to Yn. The prediction layer LP may include a plurality of layers. The ensemble parameters Wr and br may represent the connection or the network between the layers. Each of the layers may be implemented as the artificial neural network in various ways, such as the fully-connected network, the recurrent neural network, and the long short term memory (LSTM).

The prediction layer LP may be implemented to generate ensemble results R1 to Rb that are the same as a dimension of one of the learning results Y1 to Yn. The learning results Y1 to Yn may have values of n×b dimension by 'n' devices and 'b' items. The prediction layer LP may calculate the ensemble results R1 to Rb having values of the number of items. The output layer LO may sort the calculated ensemble results R1 to Rb and output the ensemble results R1 to Rb to the weight controller 327_1 of FIGS. 4 and 5.

Figure 9:
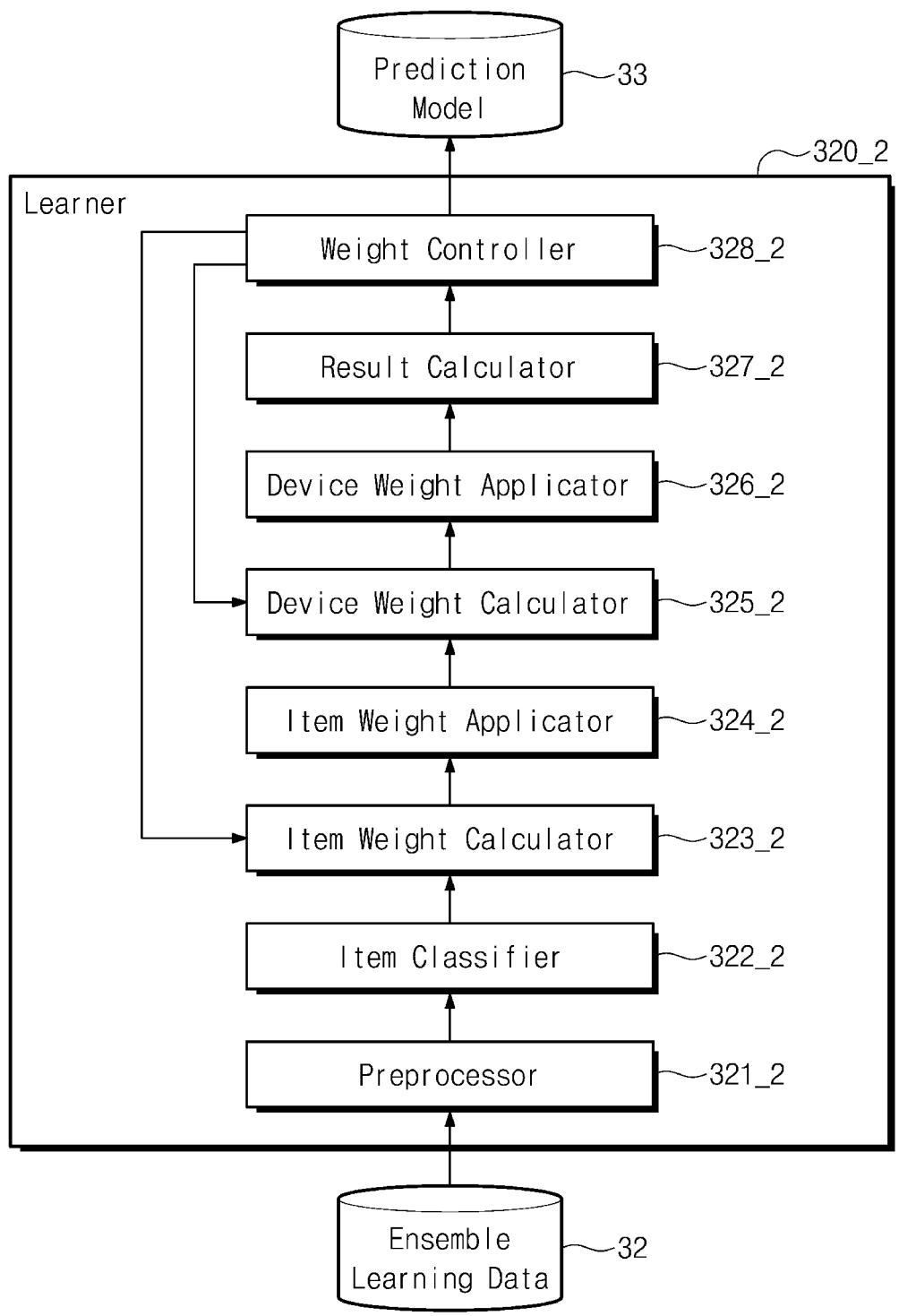
FIG. 9 is an exemplary block diagram of a learner of FIG. 4.

FIG. 9 is an exemplary block diagram of a learner of FIG. 4. A learner 320_2 of FIG. 9 will be understood as an exemplary configuration for learning the prediction model 33 and determining the weight group, based on the prediction results received from the plurality of prediction devices. The learner 320_2 includes a preprocessor 3212, an item classifier 322_2, an item weight calculator 323_2, an item weight applicator 324_2, a device weight calculator 325_2, a device weight applicator 326_2, a result calculator 327_2, and a weight controller 328_2. As described above, each components included in the learner 320_2 may be implemented in hardware, or may be implemented in firmware, software, or a combination thereof.

The preprocessor 3212 may preprocess the ensemble learning data 32 into data suitable for learning. The preprocessor 321_2 may operate substantially the same as the preprocessor 321_1 of FIG. 4.

The item classifier 322_2 may separate the preprocessed ensemble learning data for each item and group them. The item weight calculator 323_2 analyzes the grouped item values from the item classifier 322_2. The item weight calculator 323_2 may generate item weights corresponding to the item values, respectively, based on the parameters (item parameter) of the prediction model 33 for generating the item weight. The item classifier 322_2 and the item weight calculator 323_2 may operate substantially the same as the item classifier 322_1 and the item weight calculator 323_1 of FIG. 4.

The item weight applicator 324_2 may apply the item weights to the device prediction results. Unlike the weight applicator 325_1 of FIG. 4, the item weight applicator 324_2 does not apply the device weights to device prediction results. As a result of applying the item weights, the item weight applicator 324_2 may generate a first learning result that obtained by reflecting the reliability of the specific field (item) of each of the prediction devices.

The device weight calculator 325_2 analyzes the characteristics of the prediction devices, based on the device prediction results, that is, the first learning result, to which the item weights are applied. The device weight calculator 325_2 may generate device weights corresponding to the prediction devices, respectively, based on the parameters (device parameter) of the prediction model 33 for generating the device weight.

The device weight applicator 326_2 may apply the device weights to the first learning result. As a result of the applying, the device weight applicator 326_2 may generate a second learning result that the overall reliability of each of the prediction devices is applied.

The result calculator 327_2 may generate the ensemble result, based on the second learning result. The result calculator 327_2 may generate the ensemble result, based on the parameters (the ensemble parameter) of the prediction model 33. The weight controller 328_2 may adjust the parameters included in the weight group, based on the ensemble result. The parameters here include the item parameter, the device parameter, and the ensemble parameter described above. The result calculator 327_2 and the weight controller 3282 may operate substantially the same as the result calculator 326_1 and the weight controller 327_1 of FIG. 4.

Figure 10:
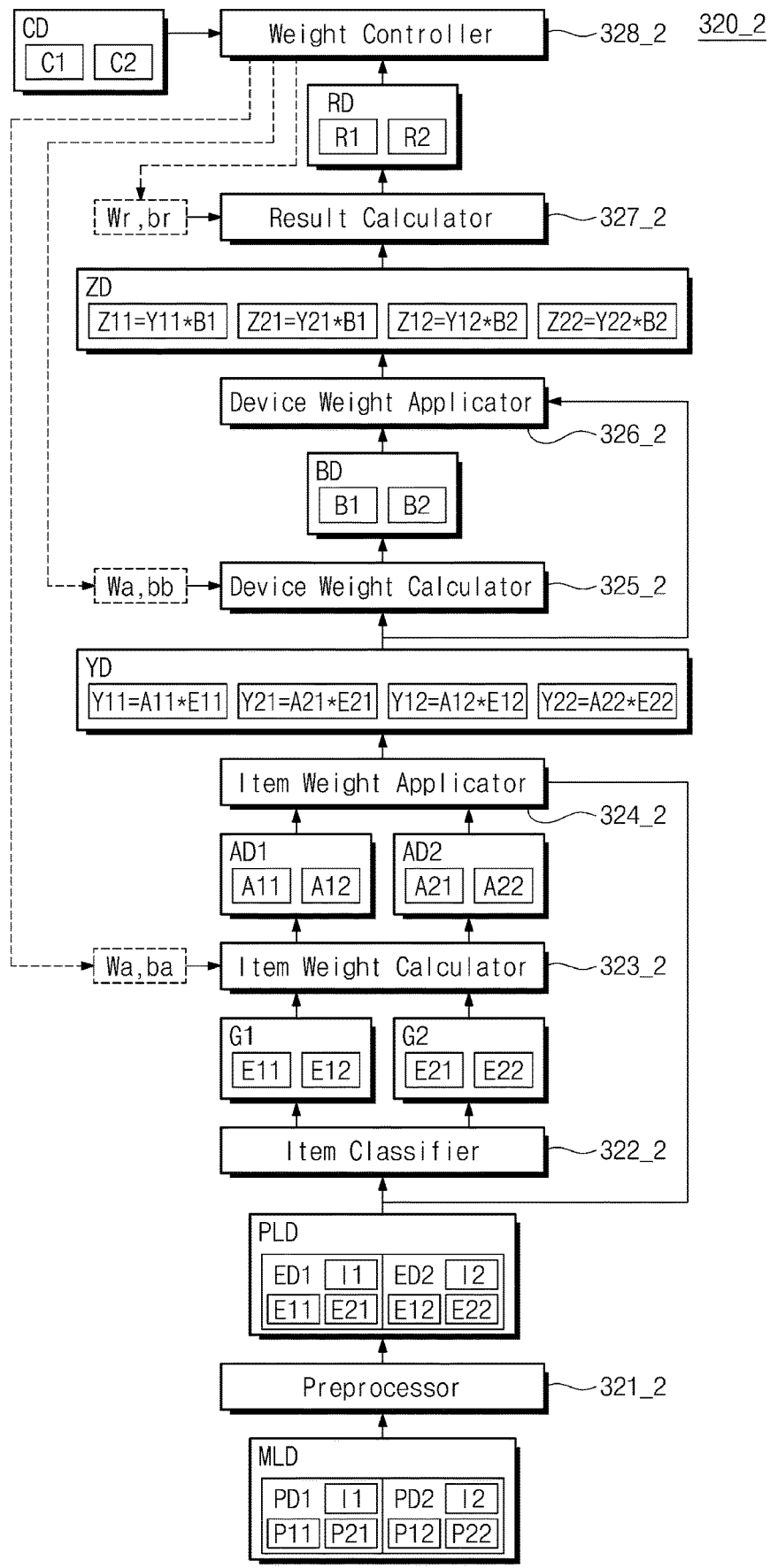
FIG. 10 is a diagram illustrating a learner of FIG. 9 in detail.

FIG. 10 is a diagram illustrating a learner of FIG. 9 in detail. Referring to FIG. 10, the learner 320_2 includes the preprocessor 3212, the item classifier 322_2, the item weight calculator 323_2, the item weight applicator 324_2, the device weight calculator 325_5, the device weight applicator 326_2, the result calculator 327_2, and the weight controller 328_2. For convenience of description, FIG. 10 will be described based on differences from the learner 320_1 of FIG. 5.

The learner 320_2 receives the merged data MLD described in FIG. 3. The merged data MLD may exemplarily include first and second device prediction results PD1 and PD2. The first device prediction result PD1 may include the first item value P11 corresponding to the first item and the second item value P21 corresponding to the second item. The second device prediction result PD2 may include the third item value P12 corresponding to the first item and the fourth item value P22 corresponding to the second item. The merged data MLD may further include the first and second identification information I1 and I2 for distinguishing the first prediction device and the second prediction device.

The preprocessor 321_2 may generate the preprocessed data PLD by preprocessing the merged data MLD. The item classifier 322_2 may group the preprocessed data PLD for each item. As a result, the first item value E11 and the third item value E12 corresponding to the first item may be grouped into the first group G1. The second item value E21 and the fourth item value E22 corresponding to the second item may be grouped into the second group G2.

The item weight calculator 323_2 may generate the first group weight AD1 for the first item, based on the first group G1. The item weight calculator 323_1 may generate the second group weight AD2 for the second item, based on the second group G2. The first group weight AD1 may include the first item weight A1 corresponding to the first item value E11 and the third item weight A12 corresponding to the third item value E12. The second group weight AD2 may include the second item weight A21 corresponding to the second item value E21 and the fourth item weight A22 corresponding to the fourth item value E22. The item weight calculator 323_2 may generate the item weights A11, A21, A12, and A22, based on the item parameter including the weight Wa and the bias ba. The item weight calculator 323_2 may generate the item weights A11, A21, A12, and A22, using the artificial neural network of FIG. 6.

The item weight applicator 324_2 may apply the item weights A11, A21, A12, and A22 to the preprocessed data PLD. As a result of the applying, a first learning result YD may be generated. The first learning result YD may include the first to fourth results Y11, Y21, Y12, and Y22 respectively corresponding to the first to fourth item values E11, E21, E12, and E22. The first result Y11 may be a result of multiplying the first item value E11 by the first item weight A11. The second result Y21 may be a result of multiplying the second item value E21 by the second item weight A21. The third result Y12 may be a result of multiplying the third item value E12 by the third item weight A12. The fourth result Y22 may be a result of multiplying the fourth item value E22 by the fourth item weight A22.

The device weight calculator 325_2 may generate the device weight BD, based on the first learning result YD. The device weight BD may include the first device weight B1 corresponding to the first prediction device and the second device weight B2 corresponding to the second prediction device. The device weight calculator 325_2 may generate the device weight BD, based on the device parameter that includes the weight Wb and the bias bb. The device weight calculator 325_2 may generate the device weight BD, using the artificial neural network of FIG. 7.

The device weight applicator 326_2 may apply the device weight BD to the first learning result YD. As a result of the applying, a second learning result ZD may be generated. The second learning result ZD may include first to fourth results Z ll1, Z21, Z12, and Z22 respectively corresponding to the first to fourth item values E11, E21, E12, and E22. The first result Z11 may be a result of multiplying the first result Y11 by the first device weight B1. The second result Z21 may be a result of multiplying the second result Y21 by the first device weight B1. The third result Z12 may be a result of multiplying the third result Y12 by the second device weight B2. The fourth result Z22 may be a result of multiplying the fourth result Y22 by the second device weight B2.

The result calculator 327_2 may generate the ensemble result RD, based on the second learning result ZD. The ensemble result RD may include the first prediction result R1 corresponding to the first item and the second prediction result R2 corresponding to the second item. The result calculator 327_2 may analyze the second learning result ZD and generate the ensemble result RD, based on the ensemble parameter including the weight Wr and the bias br. The result calculator 327_2 may generate the ensemble result RD, using the artificial neural network of FIG. 8.

The weight controller 328_2 may adjust the parameters Wa, ba, Wb, bb, Wr, and br that are included in the weight group by comparing the ensemble result RD with the comparison result CD. The comparison result CD may include the first value C1 corresponding to the first item and the second value C2 corresponding to the second item.

Figure 11:
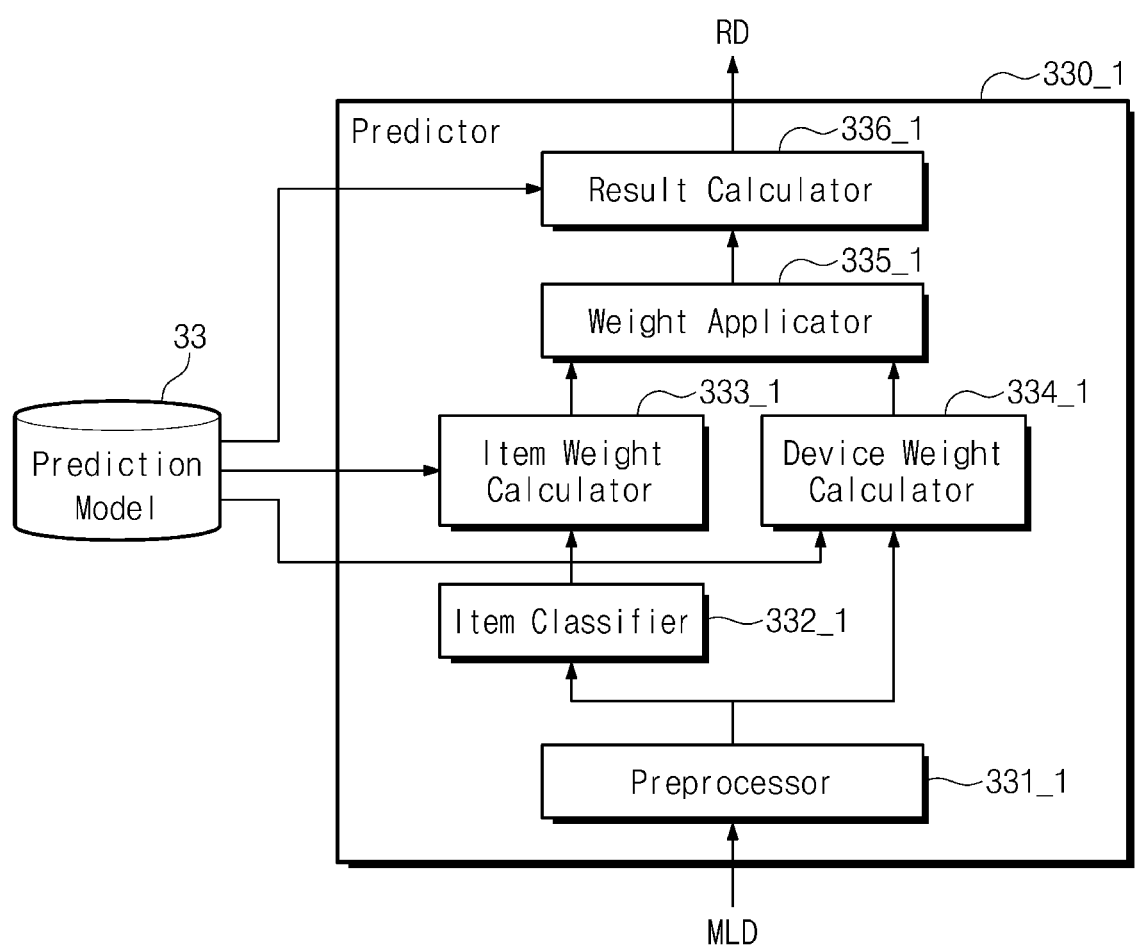
FIG. 11 is an exemplary block diagram of a predictor of FIG. 2.

FIG. 11 is an exemplary block diagram of a predictor of FIG. 2. A predictor 330_1 of FIG. 11 will be understood as an exemplary configuration for generating an ensemble result of the prediction results received from the plurality of prediction devices, based on the learned prediction model 33 and the weight group. The predictor 330_1 may include a preprocessor 331_1, an item classifier 332_1, an item weight calculator 333_1, a device weight calculator 334_1, a weight applicator 335_1, and a result calculator 336_1. As described above, each components included in the predictor 330_1 may be implemented in hardware, or may be implemented in firmware, software, or a combination thereof.

The predictor 330_1 analyzes the merged data MLD, based on the learned prediction model 33, and generates the ensemble result RD. The preprocessor 331_1, the item classifier 332_1, the item weight calculator 333_1, the device weight calculator 334_1, the weight applicator 335_1, and the result calculator 336_1 may perform substantially the same operations as the preprocessor 321_1, the item classifier 322_1, the item weight calculator 323_1, the device weight calculator 324_1, the weight applicator 325_1, and the result calculator 326_1 of FIG. 4. The artificial neural network structure of FIGS. 6 to 8 may be applied to the item weight calculator 333_1, the device weight calculator 334_1, and the result calculator 336_1, respectively.

Figure 12:
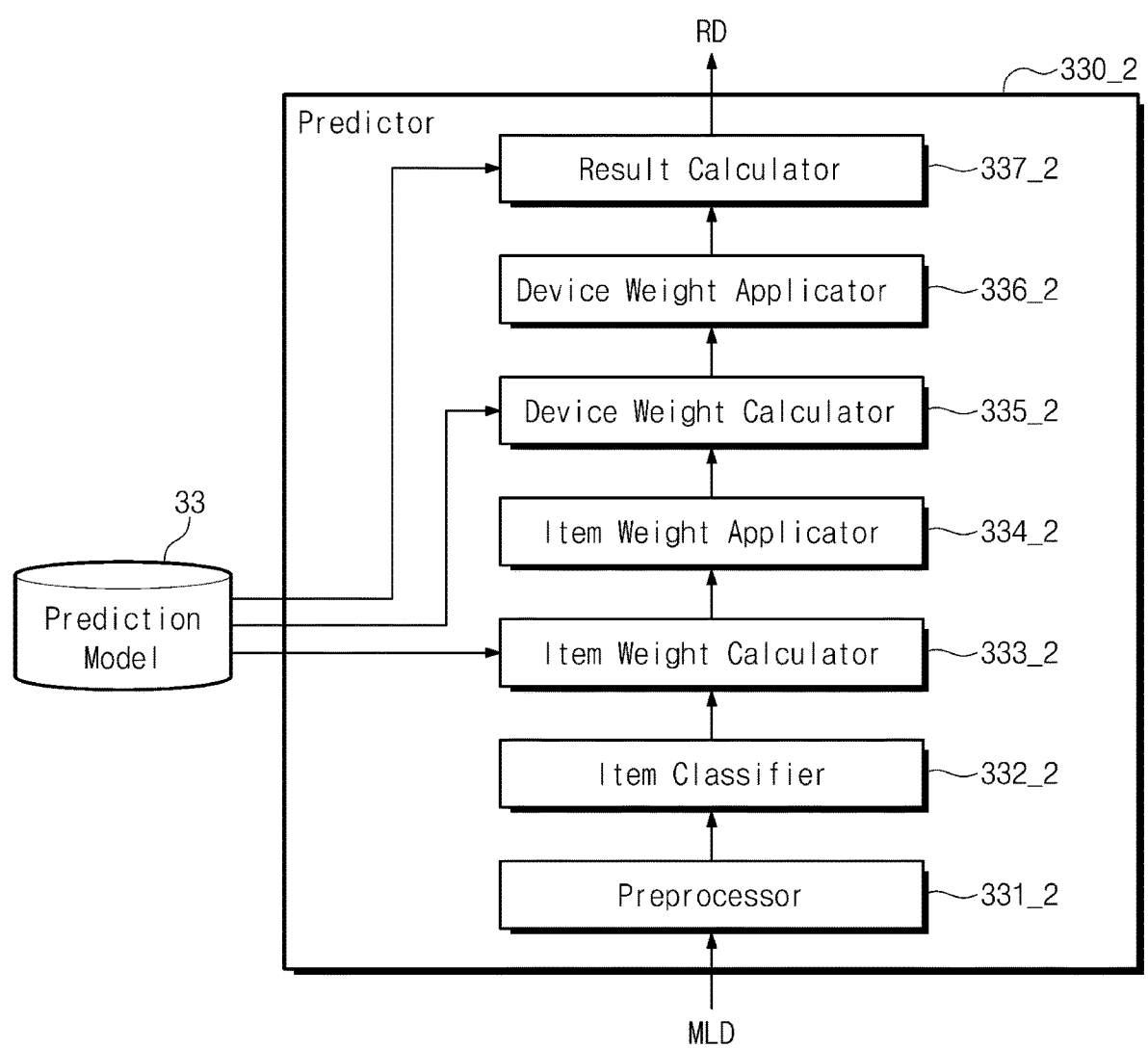
FIG. 12 is an exemplary block diagram of a predictor of FIG. 2.

FIG. 12 is an exemplary block diagram of a predictor of FIG. 2. A predictor 330_2 of FIG. 12 will be understood as an exemplary configuration for generating an ensemble result of the prediction results received from the plurality of prediction devices, based on the learned prediction model 33 and the weight group. The predictor 330_2 may include a preprocessor 331_2, an item classifier 332_2, an item weight calculator 333_2, an item weight applicator 334_2, a device weight calculator 335_2, a device weight applicator 336_2, and a result calculator 337_2. As described above, each components included in the predictor 330_2 may be implemented in hardware, or may be implemented in firmware, software, or a combination thereof.

The predictor 330_1 analyzes the merged data MLD, based on the learned prediction model 33, and generates the ensemble result RD. The preprocessor 331_2, the item classifier 3322, the item weight calculator 3332, the item weight applicator 334_2, the device weight calculator 335_2, the device weight applicator 336_2, and the result calculator 337_2 may perform substantially the same operations as the preprocessor 321_2, the item classifier 322_2, the item weight calculator 323_2, the item weight applicator 324_2, the device weight calculator 325_5, the device weight applicator 326_2, and the result calculator 327_2 in FIG. 9. In addition, the artificial neural network structure of FIGS. 6, 7, and 8 may be applied to the item weight calculator 333_2, the device weight calculator 335_2, and the result calculator 337_2, respectively.

Figure 13:
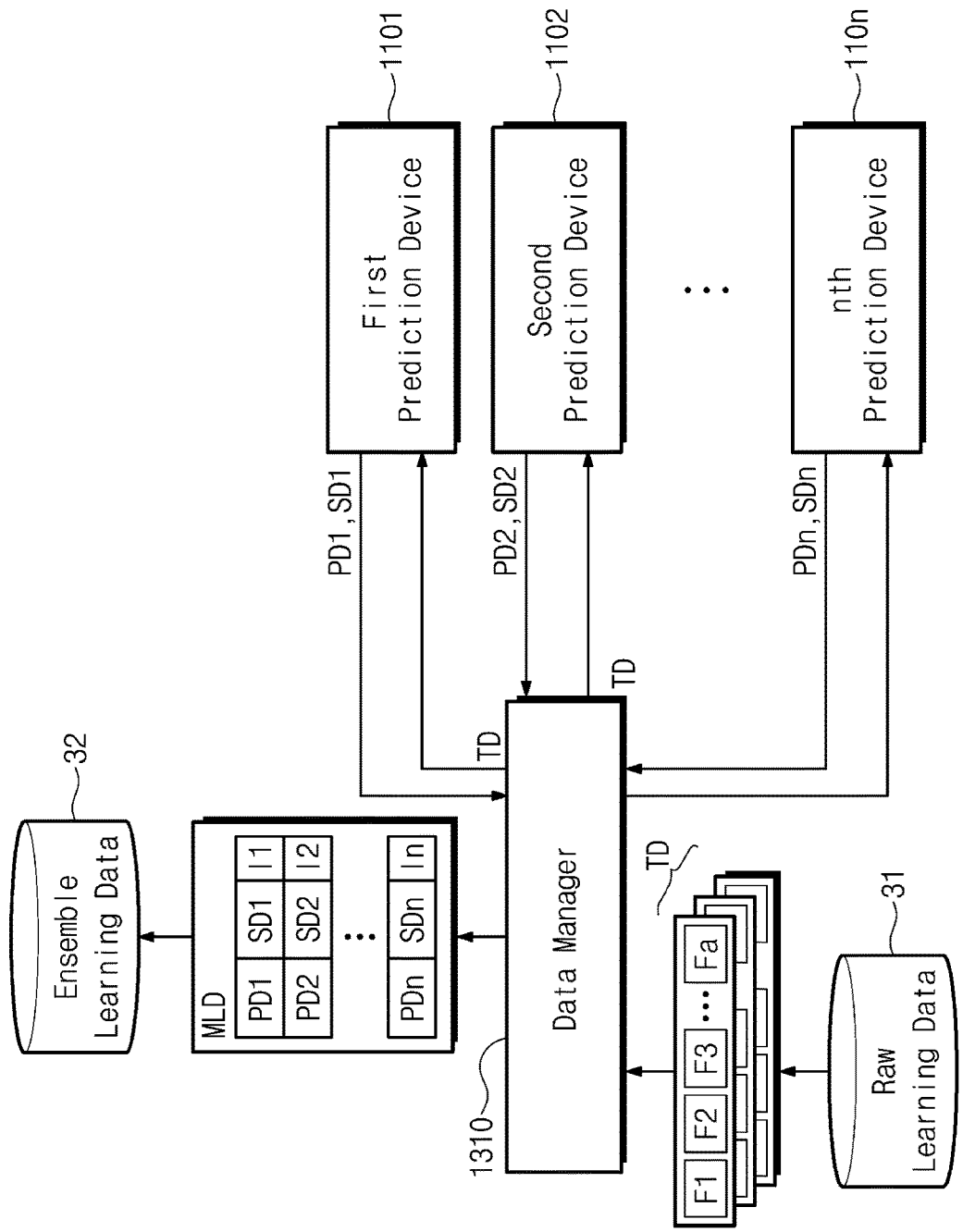
FIG. 13 is an exemplary diagram for describing an operation of a data manager of FIG. 2.

FIG. 13 is an exemplary diagram for describing an operation of a data manager of FIG. 2. Referring to FIG. 13, a data manager 1310 receives the time series data TD, as described with reference to FIG. 3. The data manager 1310 may provide the time series data TD to first to nth prediction devices 1101 to 110n together with the prediction request. In response to the prediction request, the first to nth prediction devices 1101 to 110n may analyze the time series data TD, using a separately constructed prediction model. As a result of the analysis, the first to nth prediction devices 1101 to 110n may generate the first to nth device prediction results PD1 to PDn, respectively.

The first to nth prediction devices 1101 to 11*i*On may output the first to nth device prediction results PD1 to PDn and first to nth state information SD1 to SDn, respectively, to the data manager 1310. The first to nth state information SD1 to SDn may include intermediate result values that are generated in an intermediate process for calculating the first to nth device prediction results PD1 to PDn. For example, the prediction model of the first prediction device 1101 may be implemented as the artificial neural network. The artificial neural network may include a plurality of layers, and at least some of the data values that are calculated in the intermediate layer may be included in first state information SD1 before the output layer outputs the first device prediction result PD1. Since the first state information SD1 includes information on nodes that are calculation grounds of the first device prediction result PD1, the accuracy of the ensemble result may be improved.

The data manager 1310 may merge the first to nth device prediction results PD1 to PDn and the first to nth state information SD1 to SDn to generate merged data MLD. For example, the merged data MLD may be a set in which the first to nth device prediction results PD1 to PDn, the first to nth state information SD1 to SDn, and the first to nth identification information I1 to In are grouped. The merged data MLD may be used for learning the prediction model 33 or for predicting the future health condition, using the learned prediction model 33.

Unlike FIG. 13, the data manager 1310 may receive the first to nth state information SD1 to SDn instead of the first to nth device prediction results PD1 to PDn. In this case, the merged data MLD includes the first to nth state information SD1 to SDn, and the first to nth state information SD1 to SDn may be used for learning of the prediction model 33 or for predicting the future health condition.

Figure 14A:
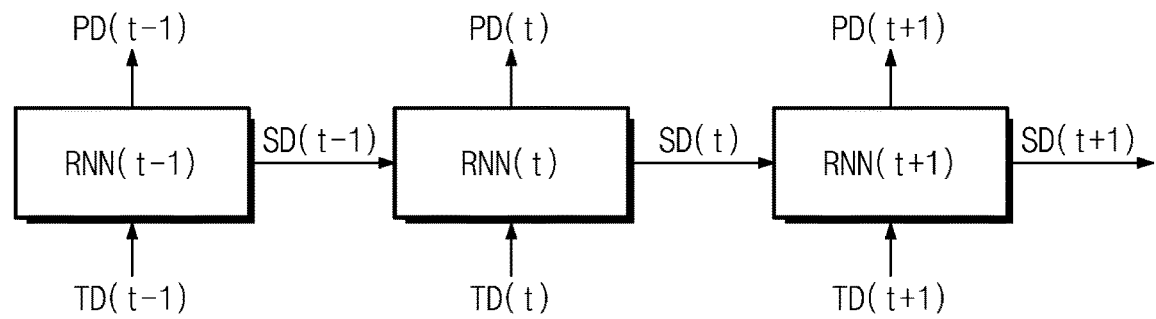
FIGS. 14A and 14B are diagrams for describing state information of FIG. 13.
Figure 14B:
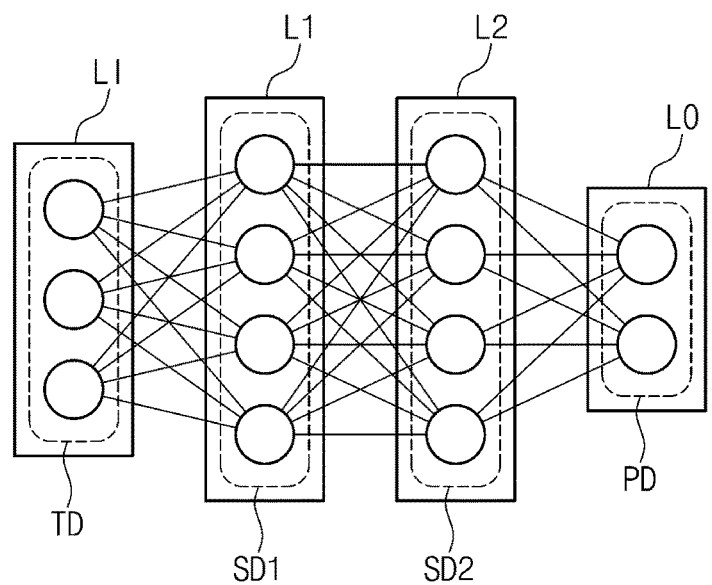

FIGS. 14A and 14B are diagrams for describing state information of FIG. 13. FIGS. 14A and 14B exemplarily illustrate an artificial neural network of a prediction model constructed on any one of the first to nth prediction devices 1101 to 110*n* of FIG. 13.

Referring to FIG. 14A, the artificial neural network may be implemented as the recurrent neural network (RNN) or the long short term memory (LSTM). In this case, one layer may receive the time series data TD over time. For example, time series data TD (t−1) corresponding to a time t−1 may be input to the RNN layer, and a prediction result value PD (t−1) corresponding to the time t−1 may be output. For time series analysis, state information SD (t−1) corresponding to the time t−1 may be used to generate a prediction result value PD (t) corresponding to a time t. The RNN layer may calculate a prediction result value PD (t) corresponding to the time t, based on time series data TD (t) corresponding to the time t and state information SD (t−1) corresponding to the time t−1. In addition, the RNN layer may calculate a prediction result value PD (t+1) corresponding to a time t+1, based on time series data TD (t+1) corresponding to the time t+1 and state information SD (t) corresponding to the time t. At least some of the state information SD (t−1), SD (t), and SD (t+1) may be included in the state information of FIG. 13.

Referring to FIG. 14B, the artificial neural network may be implemented as a feedforward network. In this case, the artificial neural network may include a plurality of layers LI, L1, L2, and LO. For example, the time series data TD may be propagated through the input layer LI, the first layer L1, the second layer L2, and the output layer LO. The time series data TD may be converted into the first state information SD1, second state information SD2, and the prediction result PD by the weights that are represented by connecting among the layers. The first state information SD1 and the second state information SD2 are represented as nodes of the first layer L1 and the second layer L2, respectively. At least some of the first state information SD1 and the second state information SD2 may be included in the state information of FIG. 13.

Figure 15:
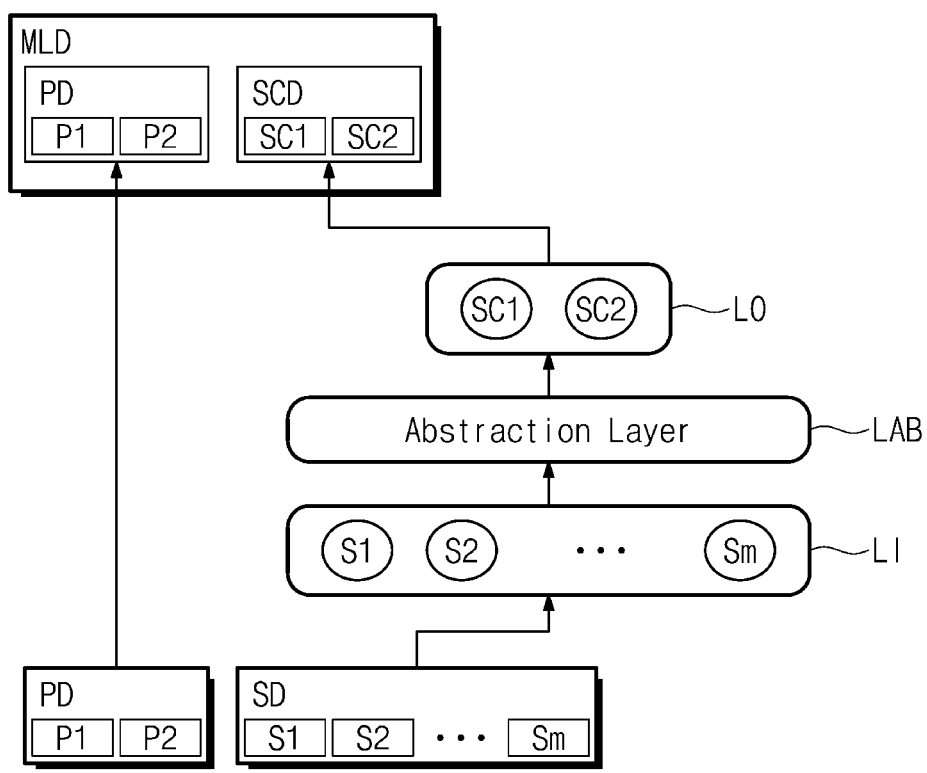
FIG. 15 is a diagram illustrating an exemplary hierarchical structure of a data manager of FIG. 13.

FIG. 15 is a diagram illustrating an exemplary hierarchical structure of a data manager of FIG. 13. The state information SD is information of a state that is not dimensionally reduced before generating a device prediction result PD, which is the final prediction result. Therefore, a dimension of the state information SD may be larger than a dimension of the device prediction result PD. FIG. 15 exemplarily illustrates the device prediction result PD including two item values P1 and P2 and state information SD including m values S1 to Sm. A data manager 1310_1 of FIG. 15 may be implemented to reduce the dimension of the state information SD.

Referring to FIG. 15, the neural network structure of the data manager 1310_1 for reducing the dimension of state information SD is exemplarily illustrated. The artificial neural network may be at least a portion of the prediction model 33 described above. The data manager 1310_1 may be implemented in hardware, or may be implemented in firmware, software, or a combination thereof. The artificial neural network may include the input layer LI, an abstraction layer LAB, and the output layer LO. The input layer LI receives the state information SD having 'm' dimensions.

The abstraction layer LAB may calculate abstraction values SC1 and SC2 having the same dimension (two dimensions) as the device prediction result PD in consideration of a relationship among the values S1 to Sm of the state information SD. The abstraction layer LAB may have a structure similar to the layer of the prediction device that generates the state information SD. The abstraction layer LAB may calculate the abstraction values SC1 and SC2, based on the abstraction parameter included in the weight group of the prediction model 33. The abstraction parameter may be learned in the ensemble prediction device including the data manager 1310_1. The output layer LO may sort and output the calculated abstraction values SC1 and SC2.

The data manager 1310_1 may merge the device prediction result PD with a state result SCD including the output abstraction values SC1 and SC2. As a result of the merge, the merged data MLD is generated. When a dimension reduction operation of the state information SD is not performed, the first group G1 of FIG. 5 for calculating the item weight may include all of the first item value P1 and the state information SD, and the second group G2 may include all of the second item value P2 and the state information SD. When the dimension reduction operation of the state information SD of FIG. 15 is performed, the first group G1 of FIG. 5 may include the first item value P1 and the first abstraction value SC1, and the second group G2 may include the second item value P2 and the second abstraction value SC2. According to the dimension reduction, the calculation amount of the item weight and the device weight of the ensemble prediction device of the inventive concept may decrease.

Figure 16:
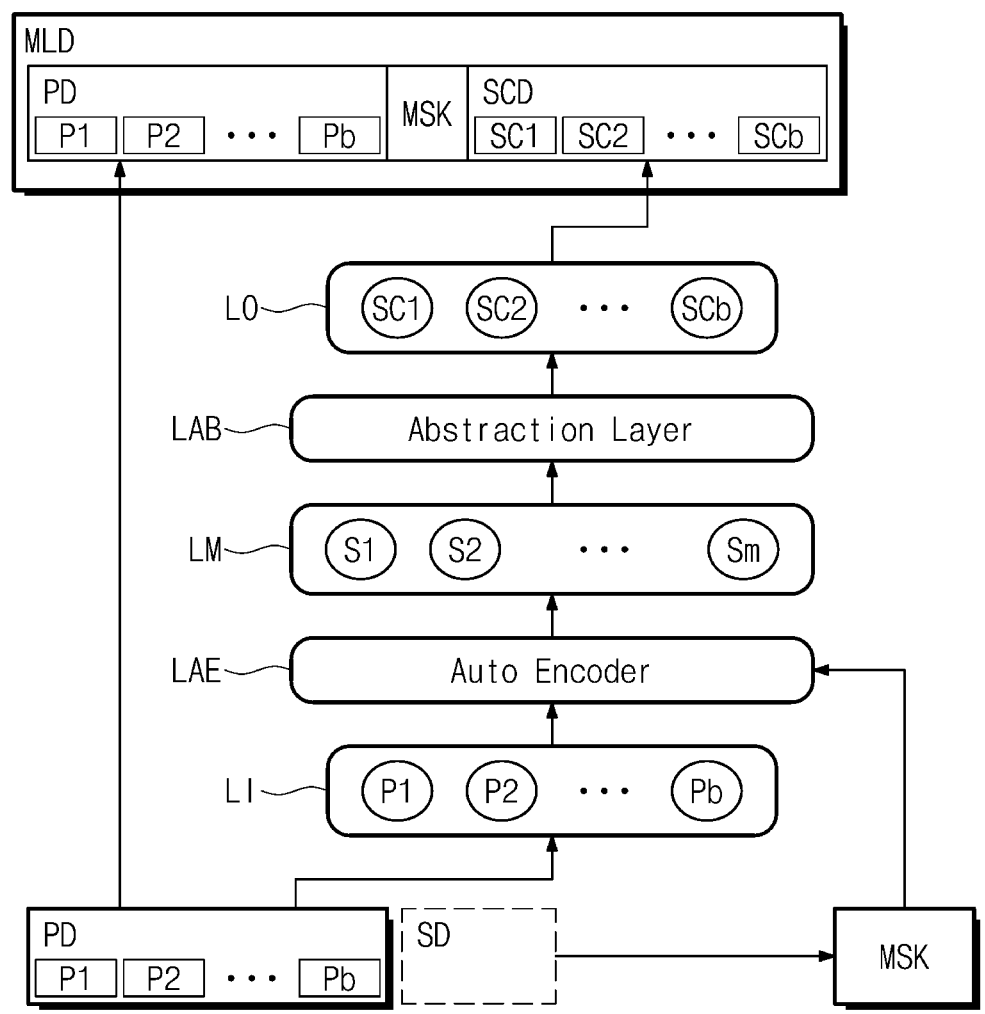
FIG. 16 is a diagram illustrating an exemplary hierarchical structure of a data manager of FIG. 13.

FIG. 16 is a diagram illustrating an exemplary hierarchical structure of a data manager of FIG. 13. The first to nth prediction devices 1101 to 110*n* of FIG. 13 may generate the device prediction result through a unique prediction model. Some of the first to nth prediction devices 1101 to 110*n* may provide the state information SD to a data manager 1310_2, while others may not provide the state information SD to the data manager 1310_2. For example, when the prediction model of the specific prediction device is implemented by a technique other than the artificial neural network and thus no state information SD is generated or a provision of the state information SD is not allowed, the data manager 1310_2 may not receive the state information SD. The data manager 1310_2 of FIG. 15 may be implemented to generate virtual state information.

Referring to FIG. 16, the artificial neural network structure of the data manager 1310_2 for generating the virtual state information is illustrated. The artificial neural network may be at least a portion of the prediction model 33 described above. The data manager 1310_2 may be implemented in hardware, or may be implemented in firmware, software, or a combination thereof. The artificial neural network may include the input layer LI, an auto encoder LAE, an intermediate layer LM, the abstraction layer LAB, and the output layer LO. The input layer LI receives the device prediction result PD including 'b' number of the item values P1 to Pb.

First, the data manager 1310_2 may determine whether the state information SD corresponding to the device prediction result PD is received. As a result of the determination, when the state information SD is not received, mask data MSK may be generated to distinguish whether the state information SD is received. The mask data MSK may have a first value when the state information SD is present, and may have a second value different from the first value when the state information SD is not present. The mask data MSK may be provided to determine whether the state information is the virtual state information when generating the item weight and the device weight. The learner or the predictor may determine the importance of the virtual state information to be relatively low, based on the mask data MSK.

The auto encoder LAE may calculate virtual state information S1 to Sm in consideration of a relationship among the item values P1 to Pb. The auto encoder LAE may be activated based on mask data MSK indicating that state information SD does not exist. The auto encoder LAE may generate the virtual state information S1 to Sm, based on an encoding parameter that is included in the weight group of the prediction model 33. The encoding parameter may include the weight and the bias, and the virtual state information S1 to Sm may be calculated, based on the encoding function to which the weight and the bias are applied. The encoding parameter may be learned in the ensemble prediction device including the data manager 1310_1. The middle layer LM may sort the calculated state information S1 to Sm and output the sorted state information S1 to Sm to the abstraction layer LAB.

The dimension of the virtual state information S1 to Sm may be different from the dimension of the device prediction result PD. As described with reference to FIG. 15, the abstraction layer LAB may calculate the abstraction values SC1 to SCb by reducing the dimension of the state information SD. The output layer LO may sort and output the abstraction values SC1 to SCb. The data manager 1310_2 may merge the state result SCD including the abstraction values SC1 to SCb, the device prediction result PD, and the mask data MSK. As a result of the merge, the merged data MLD is generated. In this case, the first group G1 of FIG. 5 may include the first item value P1 and the first abstraction value SC1, and the second group G2 may include the second item value P2 and the second abstraction value SC2.

Figure 17:
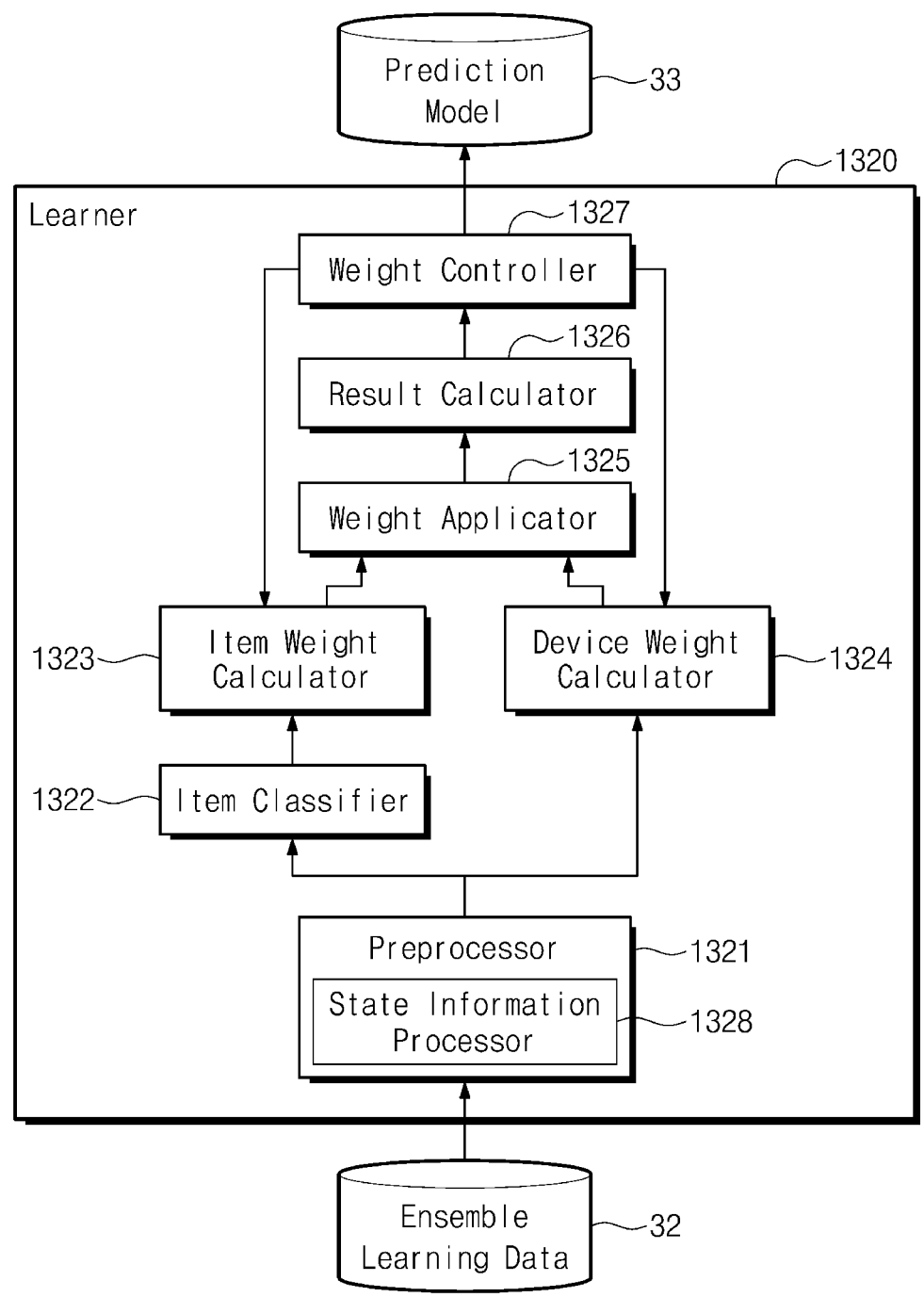
FIG. 17 is an exemplary block diagram of a learner of FIG. 2.

FIG. 17 is an exemplary block diagram of a learner of FIG. 2. Referring to FIG. 17, a learner 1320 includes a preprocessor 1321, an item classifier 1322, an item weight calculator 1323, a device weight calculator 1324, a weight applicator 1325, a result calculator 1326, and a weight controller 1327. The preprocessor 1321, the item classifier 1322, the item weight calculator 1323, the device weight calculator 1324, the weight applicator 1325, the result calculator 1326, and the weight controller 1327 respectively correspond to the preprocessor 321_1, the item classifier 322_1, the item weight calculator 323_1, the device weight calculator 324_1, the weight applicator 325_1, the result calculator 326_1, and the weight controller 327_1 of FIG. 4. Therefore, the learner 1320 of FIG. 17 will be described based on differences from the learner 320_1 of FIG. 4.

The learner 1320 receives the ensemble learning data 32. The ensemble learning data 32 includes the device prediction results and the state information, as described in FIG. 13. To process such state information, the preprocessor 1321 may include a state information processor 1328. The state information processor 1328 may preprocess the state information into data suitable for learning. The state information processor 1328 may convert the values included in the state information into a numerical type when the values included in the state information are in a non-numeric type. The state information processor 1328 may convert values of the state information into a specific numerical range. Further, the state information processor 1328 may perform the dimension reduction operation of FIG. 15 and the virtual state information generation operation of FIG. 16 instead of the data managers 1310_1 and 1310_2.

As described above with reference to FIGS. 15 and 16, the item classifier 1322 may classify the preprocessed device prediction results and the state information for each item. The item weight calculator 1323 may calculate the item weight, based on the device prediction results and the state information. The device weight calculator 1324 may calculate the device weight, based on the device prediction results and the state information. Subsequently, the learning operation is the same as described with reference to FIG. 4. Further, the learner 1320 may be implemented with the learner structure of FIG. 9, and in this case, the preprocessor 321_2 of FIG. 9 may include the state information processor.

Figure 18:
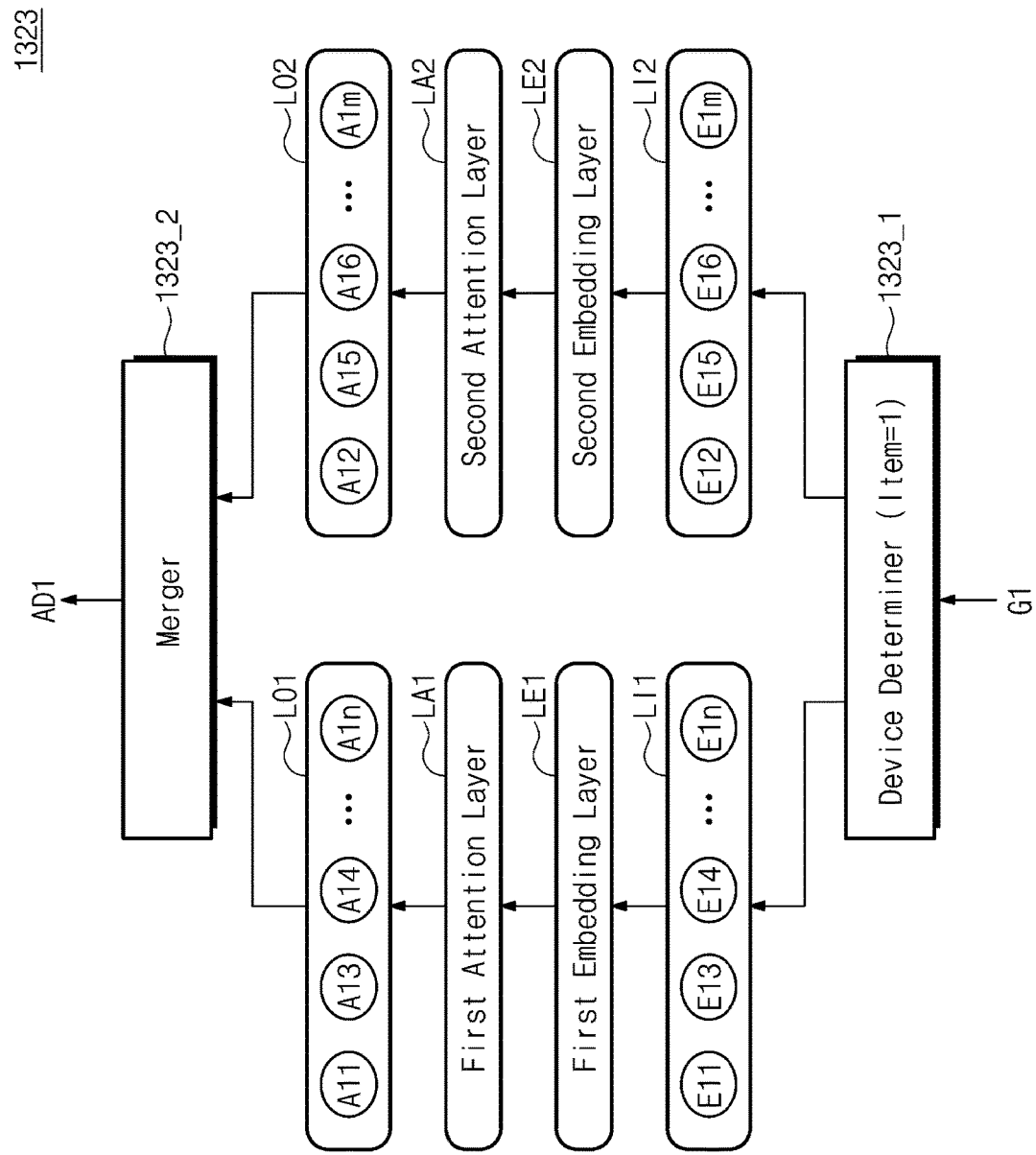
FIG. 18 is a diagram illustrating an exemplary hierarchical structure of an item weight calculator of FIG. 17.

FIG. 18 is a diagram illustrating an exemplary hierarchical structure of an item weight calculator of FIG. 17. The first to nth prediction devices 1101 to 110n of FIG. 13 may generate the device prediction result through the unique prediction model. Some of the first to nth prediction devices 1101 to 110n may provide the state information SD to the data manager 1310_2, while others may not provide the state information SD to the data manager 1310_2. The item weight calculator 1323 of FIG. 18 may be implemented to generate the item weight in consideration of the presence of the state information SD.

Referring to FIG. 18, the item weight calculator 1323 may include a device determiner 1323_1 and a merger 1323_2. The device determiner 1323_1 may receive groups that are separated by the item classifier 1322. For example, it is assumed that the device determiner 1323_1 receives the first group G1 corresponding to the first item. The first group G1 may include the first item values E11 to E n of each of the first to nth device prediction results.

The device determiner 1323_1 may determine whether there is the state information corresponding to each of the first to nth device prediction results. For example, it is assumed that the state information corresponding to the first, third, fourth, and nth device prediction results exists and the state information corresponding to the second, fifth, sixth, and mth device prediction results does not exist. The device determiner 1323_1 may separate the first, third, fourth, and nth device prediction results from the second, fifth, sixth, and mth device prediction results. When the mask data MSK as illustrated in FIG. 16 are included in the merged data MLD, the device determiner 1323_1 may determine whether the state information exists, based on the mask data MSK.

The artificial neural network for generating the item weights may be implemented in the item weight calculator 1323. The artificial neural network may be at least a portion of the prediction model 33 described above. The artificial neural network of the item weight calculator 1323 may include first and second input layers LI1 and LI2, first and second embedding layers LE1 and LE2, the first and second attention layers LA1 and LA2, first and second output layers LO1 and LO2.

The first input layer LI1 receives first item values E11, E13, E14, and E1n of the first, third, fourth, and nth device prediction results. The first input layer LI1 further receives the state information. The second input layer LI2 receives first item values E12, E15, E16, and E1m of the second, fifth, sixth, and mth device prediction results.

The first embedding layer LE1 may output a first intermediate result to the first attention layer LA1 in consideration of a relationship among the first item values E11, E13, E14, and E1n of the first, third, fourth, and nth device prediction results and the state information. The second embedding layer LE2 may output a second intermediate result to the second attention layer LA2 in consideration of a relationship among the first item values E12, E15, E16, and E1m of the second, fifth, sixth, and mth device prediction results.

The first attention layer LA1 may analyze the first intermediate result and calculate item weights A11, A13, A14, and A1n for the first item values E11, E13, E14, and E1n of the first, third, fourth, and nth device prediction results. The first output layer LO1 may output these item weights A11, A13, A14, and A1n to the merger 1323_2. The second attention layer LA2 analyzes the second intermediate result and calculate item weights A12, A15, A16, and A1m for the first item values E12, E15, E16, and E1m of the second, fifth, sixth, and mth device prediction results. The second output layer LO2 may output these item weights A12, A15, A16, and A1m to the merger 1323_2.

The merger 1323_2 may generate a first group weights AD1 by merging all received item weights A11 to A1n for the first item values. That is, the item weight calculator 1323 may perform the learning operation by distinguishing the device prediction results to which the state information is added from the device prediction results to which the state information is not added.

For example, the hierarchical structure of FIG. 18 may be applied to the device weight calculator 1324 of FIG. 18 as well as the item weight calculator 1323. Furthermore, the hierarchical structure of FIG. 18 may be applied to the item weight calculator and the device weight calculator in the predictor.

Figure 19:
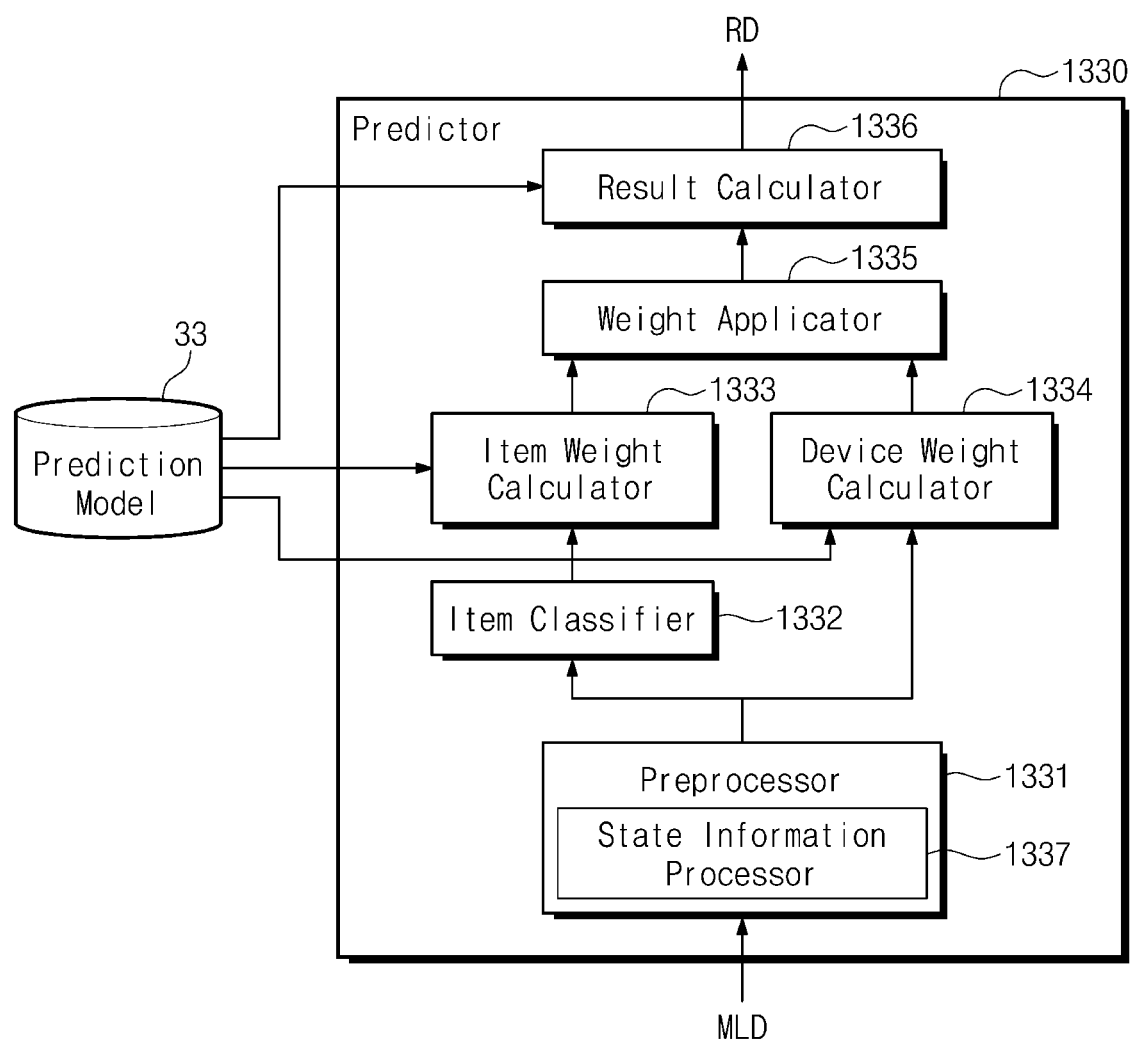
FIG. 19 is an exemplary block diagram of a predictor of FIG. 2.

FIG. 19 is an exemplary block diagram of a predictor of FIG. 2. Referring to FIG. 19, a predictor 1330 may include a preprocessor 1331, an item classifier 1332, an item weight calculator 1333, a device weight calculator 1334, a weight applicator 1335, and a result calculator 1336. The preprocessor 1331, the item classifier 1332, the item weight calculator 1333, the device weight calculator 1334, the weight applicator 1335, and the result calculator 1336 correspond to the preprocessor 331_1, the item classifier 332_1, the item weight calculator 333_1, the device weight calculator 334_1, the weight applicator 335_1, and the result calculator 336_1 of FIG. 11. Therefore, based on the predictor 330_1 of FIG. 11, the predictor 1330 of FIG. 19 will be described.

The predictor 1330 receives the merged data MLD. The merged data MLD includes the device prediction results and the state information, as described in FIG. 13. To process such state information, the preprocessor 1331 may include a state information processor 1337. The state information processor 1337 may preprocess the state information into data suitable for learning. Furthermore, the state information processor 1337 may perform the dimension reduction operation of FIG. 15 and the virtual state information generation operation of FIG. 16 instead of the data managers 1310_1 and 1310_2.

As described above with reference to FIGS. 15 and 16, the item classifier 1332 may classify the preprocessed device prediction results and the state information for each item. The item weight calculator 1333 may calculate the item weight, based on the device prediction results and the state information. The device weight calculator 1334 may calculate the device weight, based on the device prediction results and the state information. Subsequently, the prediction operation is the same as described with reference to FIG. 11. Furthermore, the predictor 1330 may be implemented with the learner structure of FIG. 12, and in this case, the preprocessor 331_2 of FIG. 12 may include the state information processor.

Figure 20:
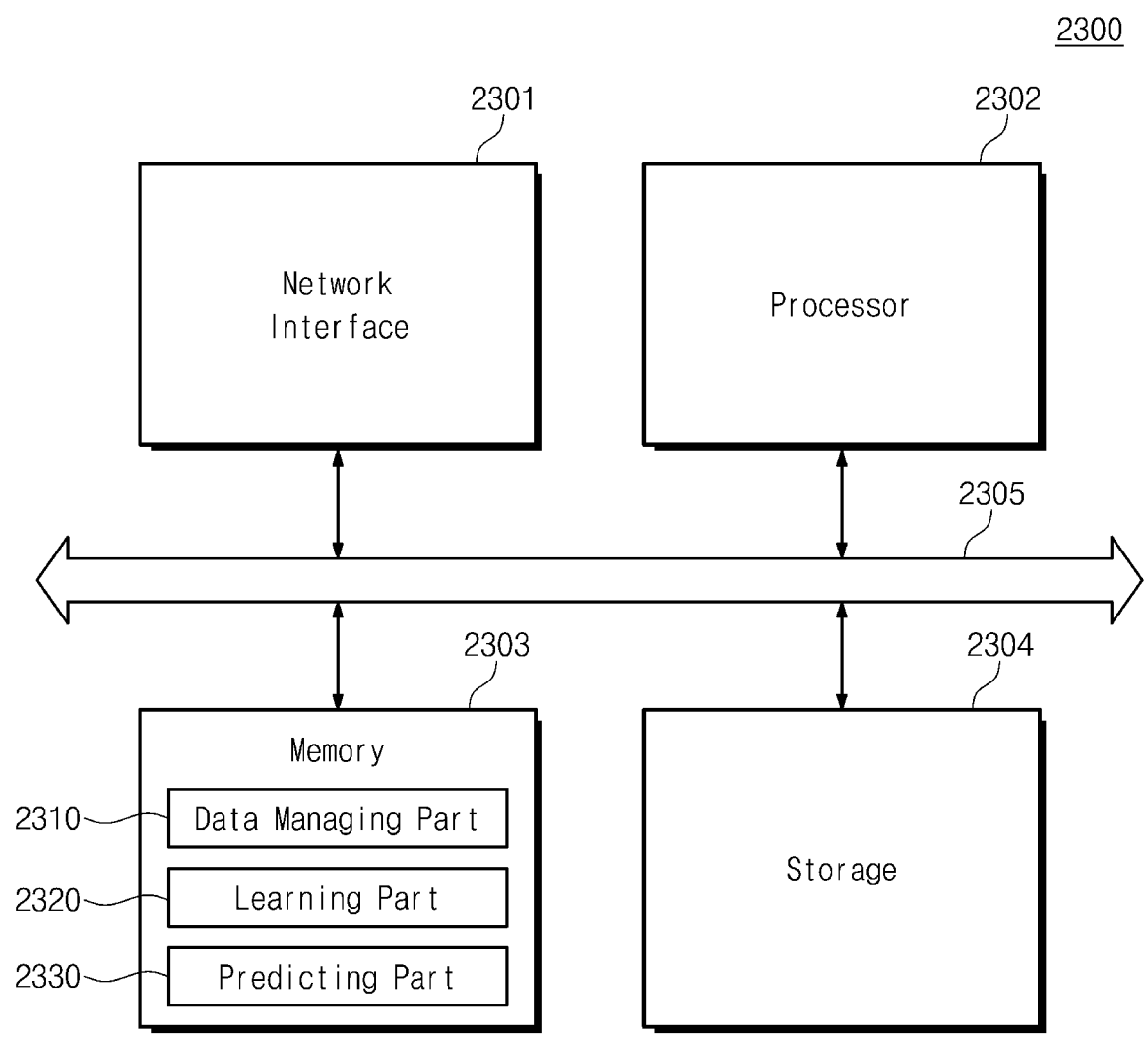
FIG. 20 is an exemplary block diagram of an ensemble prediction device in FIG. 1.

FIG. 20 is an exemplary block diagram of an ensemble prediction device in FIG. 1. Referring to FIG. 20, an ensemble prediction device 2300 may include a network interface 2301, a processor 2302, a memory 2303, storage 2304, and a bus 2305. In exemplary embodiments, the ensemble prediction device 2300 may be implemented as a server, but is not limited thereto.

The network interface 2301 is configured to communicate with the terminal 200 or the first to nth prediction devices 101 to 10n through the network 400 of FIG. 1. The network interface 2301 may provide data received through the network 400 to the processor 2302, the memory 2303, or the storage 2304 through the bus 2305. The network interface 2301 may output the time series data to the first to nth prediction devices 101 to 10n together with the prediction request by the processor 2302. In addition, the network interface 2301 may receive the device prediction results generated in response to the time series data.

The processor 2302 may perform a function as a central processing unit of the ensemble prediction device 2300. The processor 2302 may perform a control operation and a calculation operation that is required for data management, learning, and prediction of the ensemble prediction device 2300. For example, under the control of the processor 2302, the network interface 2301 may transmit the time series data to the first to nth prediction devices 101 to 10n, and receive the device prediction results from the first to nth prediction devices 101l to 10n. Under the control of the processor 2302, the weight group of the prediction model may be adjusted, and the ensemble result may be calculated using the prediction model. The processor 2302 may operate by utilizing an operation area of the memory 2303, and may read files for driving an operating system and executable files of an application from the storage 2304. The processor 2302 may execute an operating system and various applications.

The memory 2303 may store data and process codes that are or will be processed by processor 2302. For example, the memory 2303 may store the device prediction results, information for managing the device prediction results, information for generating the weight group, information for calculating the ensemble result, and information for constructing the prediction model. The memory 2303 may be used as a main memory of the ensemble prediction device 2300. The memory 2303 may include a dynamic RAM (DRAM), a static RAM (SRAM), a phase-change RAM (PRAM), a magnetic RAM (MRAM), a ferroelectric RAM (FeRAM), a resistive RAM (RRAM), etc.

A data managing part 2310, a learning part 2320, and a predicting part 2330 may be loaded into the memory 2303 and executed. The data managing part 2310, the learning part 2320, and the predicting part 2330 correspond to the data manager 310, the learner 320, and the predictor 330 of FIG. 2, respectively. The data managing part 2310, the learning part 2320, and the predicting part 2330 may be part of an operation area of the memory 2303. In this case, the data managing part 2310, the learning part 2320, and the predicting part 2330 may be implemented by firmware or software. For example, the firmware may be stored in the storage 2304 and loaded into the memory 2303 when executing the firmware. The processor 2302 may execute firmware loaded in the memory 2303.

The data managing part 2310 may be operated to load the time series data included in raw learning data that are stored in the storage 2304 under the control of the processor 2302, and may be operated to transmit the time series data to the first to nth prediction devices 101 to 10n through the network interface 2301. The data managing part 2310 may be operated to merge the device prediction results to generate the merged data for learning or prediction. The learning part 2320 may be operated to preprocess and analyze the merged data under the control of the processor 2302 to generate and adjust the weight group. The predicting part 2330 may be operated to generate the ensemble result, based on the prediction model under the control of the processor 2302.

The storage 2304 may store data that are generated for long-term storage by the operating system or applications, a file for driving the operating system, or an executable file of applications, etc. For example, the storage 2304 may store the files for executing the data managing part 2310, the learning part 2320, and the predicting part 2330. The storage 2304 may be used as an auxiliary memory of the ensemble prediction device 2300. The storage 2304 may include the flash memory, the phase-change RAM (PRAM), the magnetic RAM (MRAM), the ferroelectric RAM (FeRAM), the resistive RAM (RRAM), etc.

The bus 2305 may provide a communication path among components of the ensemble prediction device 2300. Through the bus 2305, the network interface 2301, the processor 2302, the memory 2303, and the storage 2304 may exchange data with one another. The bus 2305 may be configured to support various types of communication formats that are used in the ensemble prediction device 2300.

According to embodiments of the inventive concept, by constructing a prediction model to comprehensively consider item values of each of prediction results for each device and weights of the device itself, the accuracy and the reliability of an ensemble result of the prediction results for each device may be improved.

According to embodiments of the inventive concept, by further considering an unbalance of state information by prediction models for each device and state information for each device, the accuracy and reliability of the ensemble result of the prediction results for each device may be improved.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. A device for ensembling data received from a plurality of prediction devices, the device comprising:
   a data manager configured to:
      provide raw learning data to a first prediction device and a second prediction device,
      receive a first device prediction result corresponding to the raw learning data from the first prediction device, and
      receive a second device prediction result corresponding to the raw learning data from the second prediction device;
   a learner configured to adjust a weight group of a prediction model for generating first item weights depending on first item values of the first and second device prediction results, second item weights depending on second item values of the first and second device prediction results, a first device weight corresponding to the first prediction device, and a second device weight corresponding to the second prediction device, based on the first device prediction result and the second device prediction result; and
   a predictor configured to generate an ensemble result from predication results received from the first and second prediction device using the prediction model, wherein the weight group comprises a first parameter for generating the first item weights, a second parameter for generating the second item weights, and a third parameter for generating the first and second device weights,
   wherein the learner includes:
      an item weight calculator configured to calculate the first item weights, based on the first item values and the first parameter and calculate the second item weights, based on the second item values and the second parameter;
      a device weight calculator configured to calculate the first and second device weights, based on the first and second device prediction results and the third parameter;
      a weight applicator configured to apply the first and second item weights and the first device weight to the first device prediction result to generate a first result, and apply the first and second item weights and the second device weight to the second device prediction result to generate a second result; and
      a weight controller configured to adjust the first parameter, the second parameter, and the third parameter, based on the first and second results, and
   wherein the item weight calculator includes a neural network that includes:
      a first input layer configured to receive the first item values;
      a first embedding layer configured to output a first intermediate result in consideration of a relationship between the first item values; and
      a first attention layer configured to analyze the first intermediate result and calculate the first item weights using an attention mechanism.

2. The device of claim 1, wherein the learner further comprises:
an item classifier configured to group the first item values of the first and second device prediction results to output to the item weight calculator, and to group the second item values of the first and second device prediction results to output to the item weight calculator.

3. The device of claim 1, wherein the weight group further comprises a fourth parameter for generating an ensemble result having the same dimension as the first result or the second result,
wherein the learner further comprises a result calculator configured to generate the ensemble result, based on the first and second results and the fourth parameter, and
wherein the weight controller adjusts the first to fourth parameters, based on the ensemble result.

4. The device of claim 3, wherein the weight controller adjusts the first to fourth parameters until the ensemble result is within a reference error from a preset comparison result.

5. The device of claim 1, wherein the learner includes:
an item weight calculator configured to calculate the first item weights, based on the first item values and the first parameter and calculate the second item weights, based on the second item values and the second parameter;
an item weight applicator configured to apply the first item weights to the first item values and apply the second item weights to the second item values to generate an intermediate result;
a device weight calculator configured to calculate the first and second device weights, based on the intermediate result and the third parameter;
a device weight applicator configured to apply the first device weight to a value corresponding to the first device prediction result among the intermediate result to generate a first result, and to apply the second device weight to a value corresponding to the second device prediction result among the intermediate result to generate a second result; and
a weight controller configured to adjust the first parameter, the second parameter, and the third parameter, based on the first and second results.

6. The device of claim 5, wherein the weight group further comprises a fourth parameter for generating an ensemble result having the same dimension as the first result or the second result,
wherein the learner further comprises a result calculator configured to generate the ensemble result, based on the first and second results and the fourth parameter, and
wherein the weight controller adjusts the first to fourth parameters, based on the ensemble result.

7. The device of claim 1, wherein the data manager further receives first state information of a first prediction model for generating the first device prediction result from the first prediction device, and further receives second state information of a second prediction model for generating the second device prediction result from the second prediction device, and
wherein the learner adjusts the weight group, further based on the first state information and the second state information.

8. The device of claim 7, wherein the data manager or the learner converts a dimension of the first state information to be the same as a dimension of the first device prediction result, and converts a dimension of the second state information to be the same as a dimension of the second device prediction result.

9. The device of claim 1, wherein the data manager further receives first state information for generating the first device prediction result from the first prediction device,
wherein the data manager or the learner generates second state information corresponding to the second prediction device, based on the second device prediction result, and
wherein the learner adjusts the weight group, further based on the first state information and the second state information.

10. The device of claim 9, wherein the data manager or the learner generates first mask information corresponding to the first device prediction result, based on the first state information, and second mask information corresponding to the second device prediction result, based on the second state information, and
wherein the learner adjusts the weight group, further based on the first mask information and the second mask information.

11. The device of claim 1, wherein the data manager further receives state information for generating the first device prediction result from the first prediction device, and
wherein the learner calculates first intermediate item weights, based on the state information and the first device prediction result, calculates second intermediate item weights, based on the second device prediction result, and merges the first and second intermediate item weights to generate the first and second item weights.

12. A device for ensembling data received from a plurality of prediction devices, the device comprising:
a data manager configured to:
provide time series data to a first prediction device and a second prediction device,
receive a first device prediction result corresponding to the time series data from the first prediction device, and
receive a second device prediction result corresponding to the time series data from the second prediction device; and
a predictor configured to: generate first item weights depending on first item values of the first and second device prediction results, second item weights depending on second item values of the first and second device prediction results, a first device weight corresponding to the first prediction device, and a second device weight corresponding to the second prediction device, based on the first and second device prediction results, and configured to generate an ensemble result of the first and second device prediction results, based on the first and second item weights and the first and second device weights,
wherein the predictor includes:
a preprocessor configured to preprocess the first and second item values of the first and second device prediction results;
an item weight calculator configured to calculate the first item weights, based on the preprocessed first item values, and calculate the second item weights, based on the preprocessed second item values; and
a device weight calculator configured to calculate the first and second device weights, based on the preprocessed first and second device prediction results, and wherein the item weight calculator includes a neural network that includes:
a first input layer configured to receive the first item values;
a first embedding layer configured to output a first intermediate result in consideration of a relationship between the first item values; and
a first attention layer configured to analyze the first intermediate result and calculate the first item weights using an attention mechanism.

13. The device of claim 12, further comprising storage in which a weight group of a prediction model comprising a first parameter for generating the first item weights, a second parameter for generating the second item weights, and a third parameter for generating the first and second device weights, is stored, and
wherein the predictor calculates the first item weights, based on the first item values and the first parameter, calculates the second item weights, based on the second item values and the second parameter, and calculates the first and second device weights, based on the first and second device prediction results and the third parameter.

14. The device of claim 12, wherein the predictor includes:
an item weight applicator configured to apply the first item weights to the preprocessed first item values and apply the second item weights to the preprocessed second item values, to generate an intermediate result;
the device weight calculator configured to calculate the first and second device weights, based on the intermediate result;
a device weight applicator configured to apply the first device weight to a value corresponding to the first device prediction result among the intermediate result, to generate a first result, and apply the second device weight to a value corresponding to the second device prediction result among the intermediate result, to generate a second result; and
a result calculator configured to generate the ensemble result having the same dimension as the first result or the second result, based on the first and second results.

15. The device of claim 12, wherein the data manager further receives first state information of a first prediction model for generating the first device prediction result from the first prediction device, and further receives second state information of a second prediction model for generating the second device prediction result from the second prediction device, and
wherein the predictor generates the ensemble result, further based on the first state information and the second state information.

16. A method of operating a device for ensembling data received from a plurality of prediction devices, the method comprising:
providing time series data and a prediction request to a first prediction device and a second prediction device;
receiving a first device prediction result of the time series data that is responsive to the prediction request, from the first prediction device;
receiving a second device prediction result of the time series data that is responsive to the prediction request, from the second prediction device;
preprocessing, using a preprocessor of a predictor, the first and second device prediction results;
generating, using an item weight calculator of the predictor, first item weights that depend on first item values of the first and second device prediction results, based on the preprocessed first and second device prediction results;
generating, using the item weight calculator of the predictor, second item weights that depend on second item values of the first and second device prediction results, based on the preprocessed first and second device prediction results;
generating, using a device weight calculator of the predictor, a first device weight corresponding to the first prediction device and a second device weight corresponding to the second prediction device, based on the preprocessed first and second device prediction results;
generating, using a weight applicator of the predictor, a first result by applying the first and second item weights and the first device weight to the preprocessed first device prediction result;
generating, using the weight applicator of the predictor, a second result by applying the first and second item weights and the second device weight to the preprocessed second device prediction result; and
generating an ensemble result, by the predictor using a prediction model, based on the first result and the second result,
wherein the item weight calculator includes a neural network that includes a first input layer, a first embedding layer, and a first attention layer, and
wherein generating the first item weights, using the item weight calculator, includes:
receiving, by the first input layer, the first item values;
outputting, by the first embedding layer, a first intermediate result in consideration of a relationship between the first item values;
analyzing, by the first attention layer, the first intermediate result; and
calculating, by the first attention layer, the first item weights using an attention mechanism.

17. The method of claim 16, further comprising:
adjusting a parameter for generating the first and second item weights and the first and second device weights, based on the ensemble result.

18. The method of claim 16, wherein the generating of the first result includes:
multiplying a first item value of the preprocessed first device prediction result, a first item weight corresponding to the first device prediction result among the first item weights, and the first device weight; and
multiplying a second item value of the preprocessed first device prediction result, a second item weight corresponding to the first device prediction result among the second item weights, and the first device weight, and
wherein the generating of the second result includes:
multiplying a first item value of the preprocessed second device prediction result, a first item weight corresponding to the second device prediction result among the first item weights, and the second device weight; and
multiplying a second item value of the preprocessed second device prediction result, a second item weight corresponding to the second device prediction result among the second item weights, and the second device weight.

* * * * *